(12) United States Patent
Lin et al.

(10) Patent No.: US 9,739,096 B2
(45) Date of Patent: Aug. 22, 2017

(54) CUTTER ASSEMBLY WITH AT LEAST ONE ISLAND AND A METHOD OF MANUFACTURING A CUTTER ASSEMBLY

(71) Applicant: Diamond Innovations, Inc., Worthington, OH (US)

(72) Inventors: Yuanbo Lin, Lewis Center, OH (US); Bruce Jake Reierson, Delaware, OH (US); Joseph Michael Rhodes, Heath, OH (US); John W Lucek, Powell, OH (US)

(73) Assignee: Diamond Innovations, Inc., Worthington, OH (US)

( * ) Notice: Subject to any disclaimer, the term of this patent is extended or adjusted under 35 U.S.C. 154(b) by 0 days.

(21) Appl. No.: 15/090,606

(22) Filed: Apr. 4, 2016

(65) Prior Publication Data

US 2017/0016280 A1   Jan. 19, 2017

Related U.S. Application Data

(63) Continuation of application No. 13/339,474, filed on Dec. 29, 2011, now Pat. No. 9,303,462.

(51) Int. Cl.
| | |
|---|---|
| *E21B 10/567* | (2006.01) |
| *E21B 10/573* | (2006.01) |
| *C22C 26/00* | (2006.01) |
| *B23K 31/02* | (2006.01) |
| E21B 10/56 | (2006.01) |
| B22F 7/06 | (2006.01) |
| B22F 5/00 | (2006.01) |

(52) U.S. Cl.
CPC ........ *E21B 10/5673* (2013.01); *B23K 31/025* (2013.01); *C22C 26/00* (2013.01); *E21B 10/5676* (2013.01); *E21B 10/5735* (2013.01); *B22F 7/062* (2013.01); *B22F 2005/001* (2013.01); *C22C 2204/00* (2013.01); *E21B 2010/562* (2013.01); *E21B 2010/563* (2013.01); *E21B 2010/565* (2013.01)

(58) Field of Classification Search
CPC .............. E21B 10/567; E21B 10/5673; E21B 10/5676; E21B 10/5735
USPC .................. 175/28, 430, 432, 426, 434, 435
See application file for complete search history.

(56) References Cited

U.S. PATENT DOCUMENTS

| | | | |
|---|---|---|---|
| 7,971,663 B1 * | 7/2011 | Vail .......................... | B01J 3/062 175/428 |
| 2008/0230279 A1 * | 9/2008 | Bitler ....................... | B22F 3/15 175/433 |

* cited by examiner

*Primary Examiner* — George Gray
(74) *Attorney, Agent, or Firm* — Maria C. Pollick

(57) ABSTRACT

A cutter assembly includes a substrate and at least one island. The substrate includes a surface circumscribed by a peripheral edge, a flank surface extending from the peripheral edge, and at least one pocket with an opening on the surface and spaced apart from the peripheral edge. The at least one pocket extends from the opening towards an interior of the substrate. The at least one island is in the at least one pocket, and the at least one island includes a cutting surface that is exposed by the opening of the at least one pocket.

6 Claims, 21 Drawing Sheets

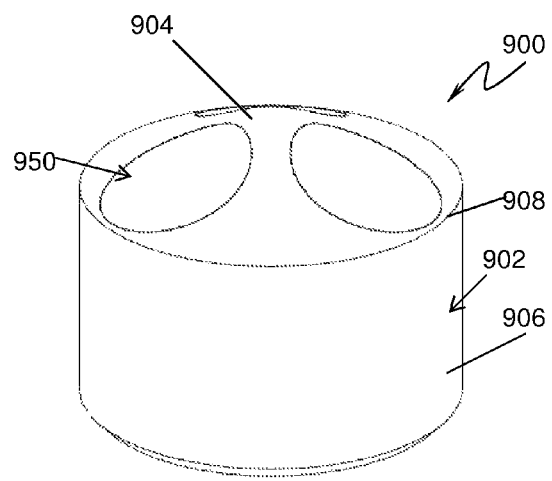
FIG. 20
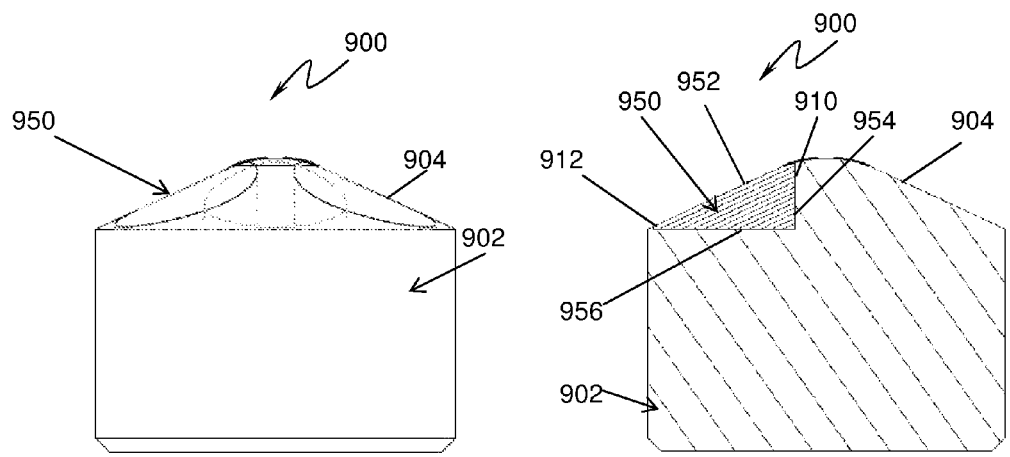
FIG. 21
FIG. 22

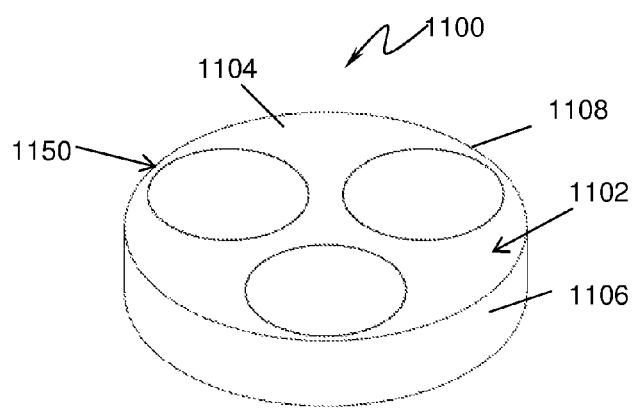
FIG. 26
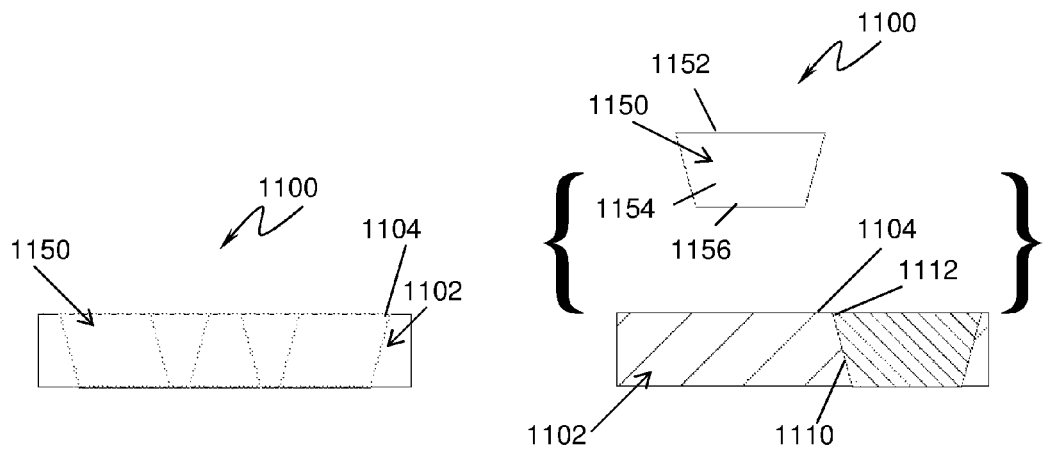
FIG. 27
FIG. 28

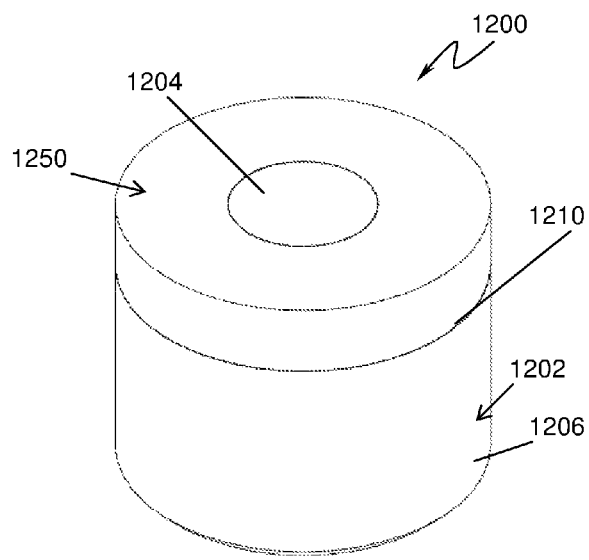
FIG. 29
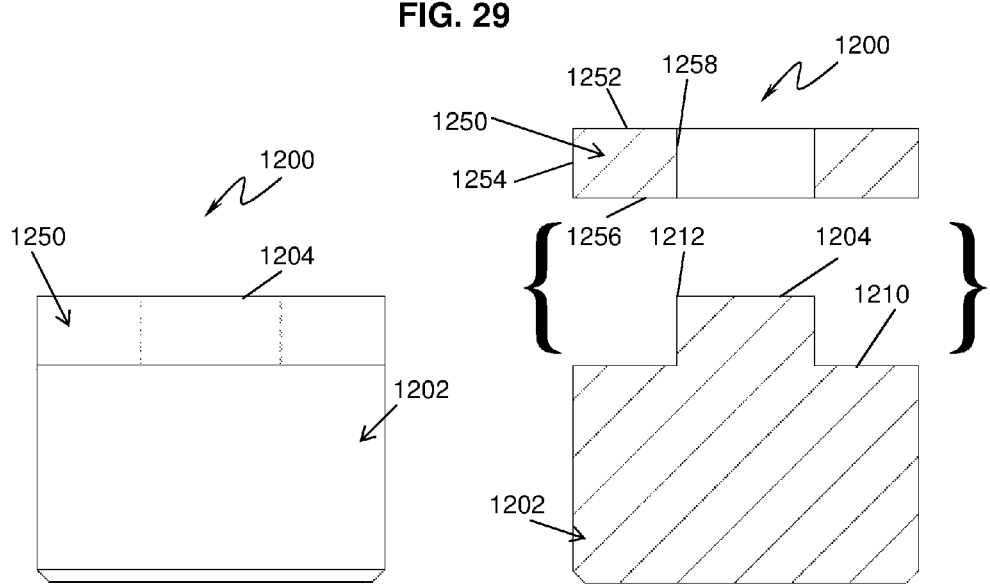
FIG. 30  FIG. 31

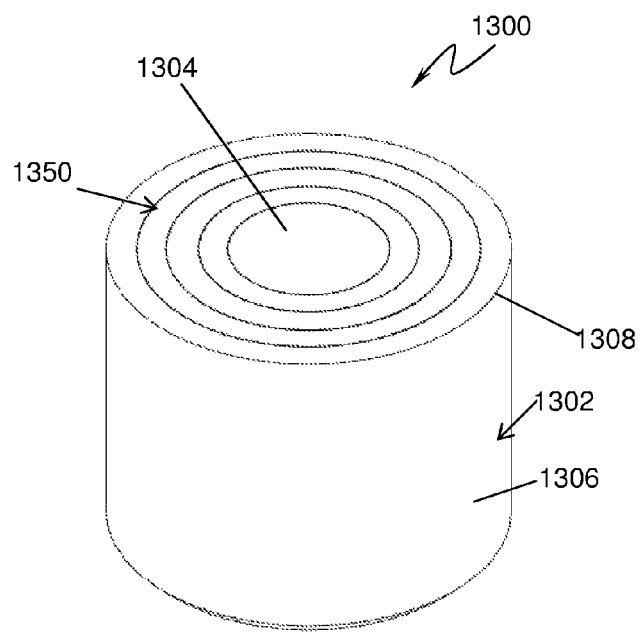
FIG. 32
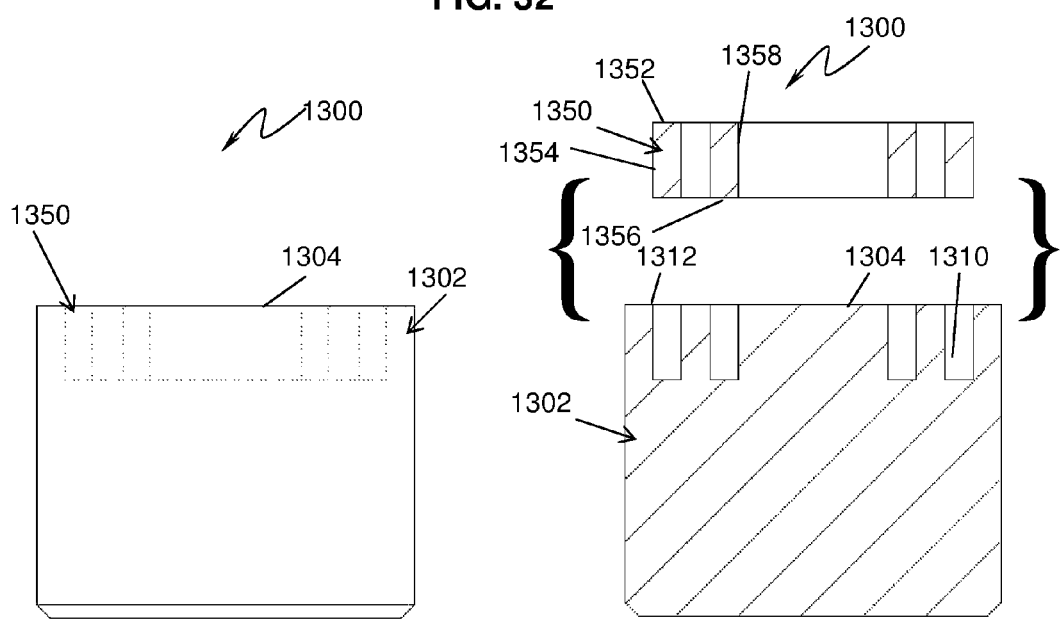
FIG. 33
FIG. 34

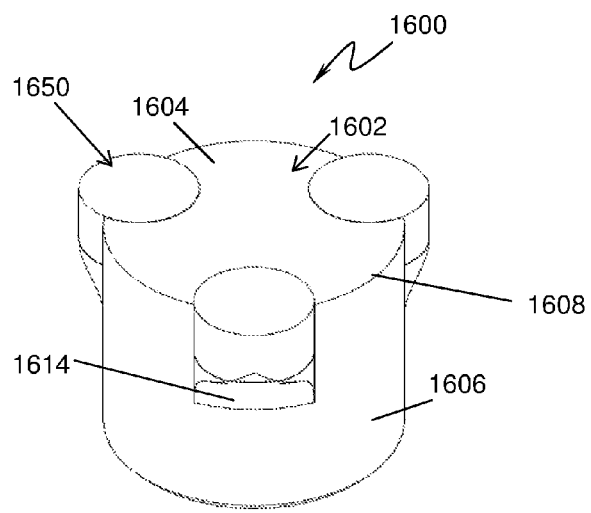
FIG. 44
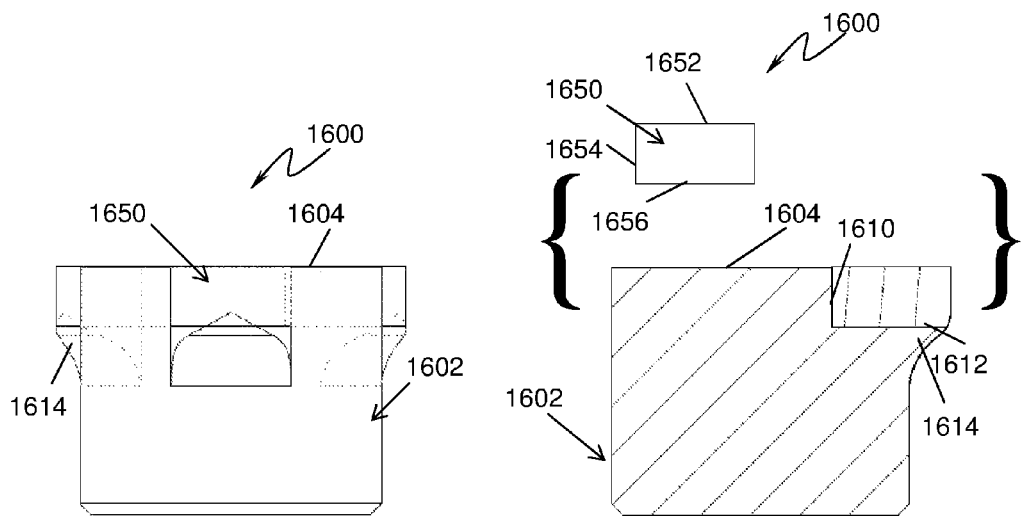
FIG. 45
FIG. 46

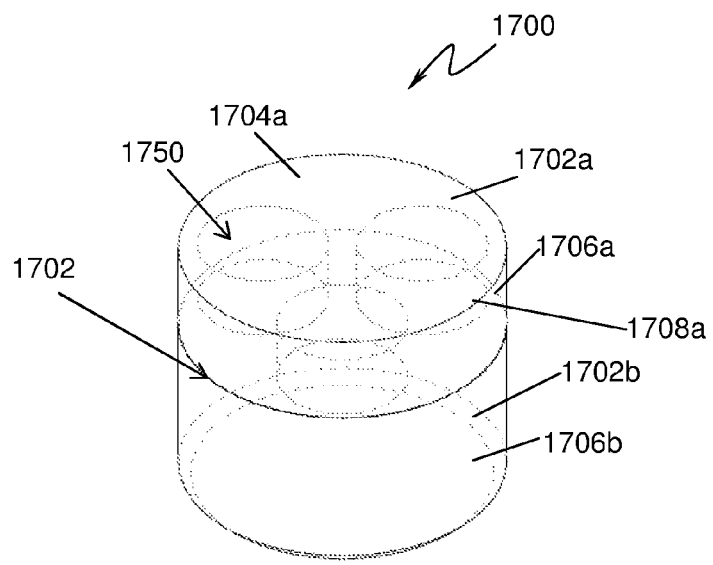
FIG. 47
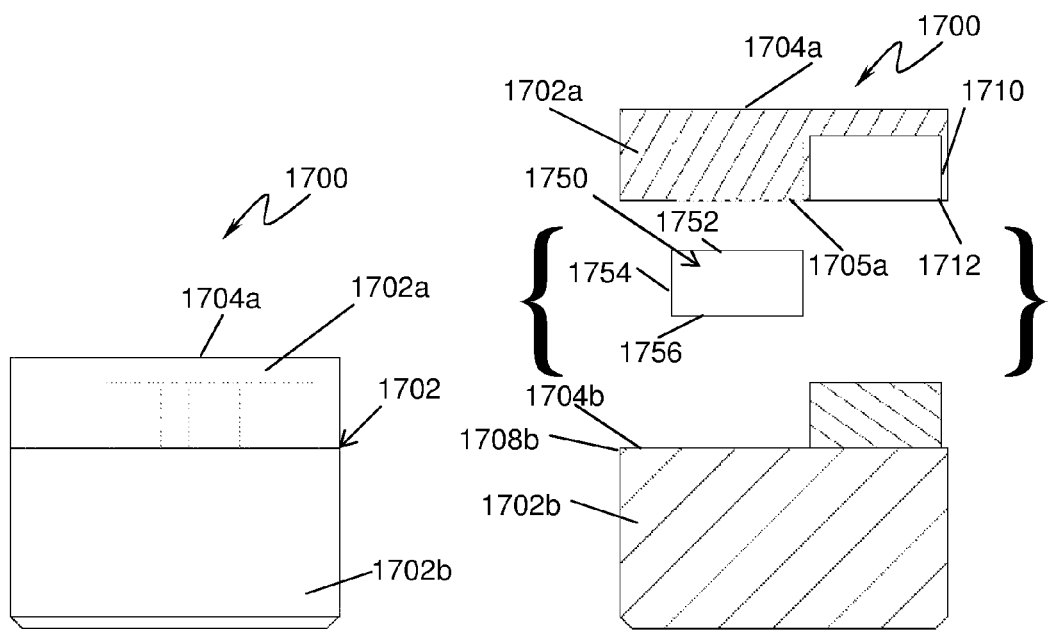
FIG. 48  FIG. 49

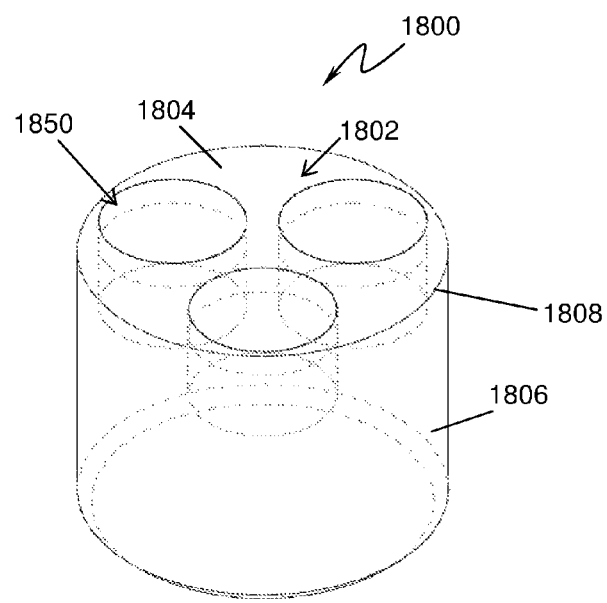
FIG. 50
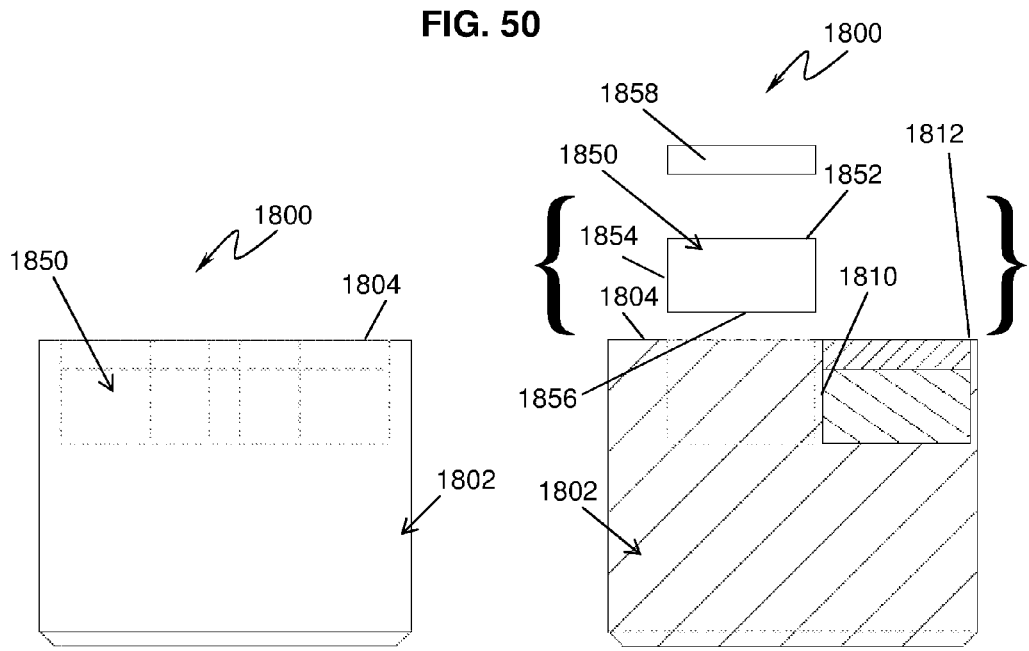
FIG. 51
FIG. 52

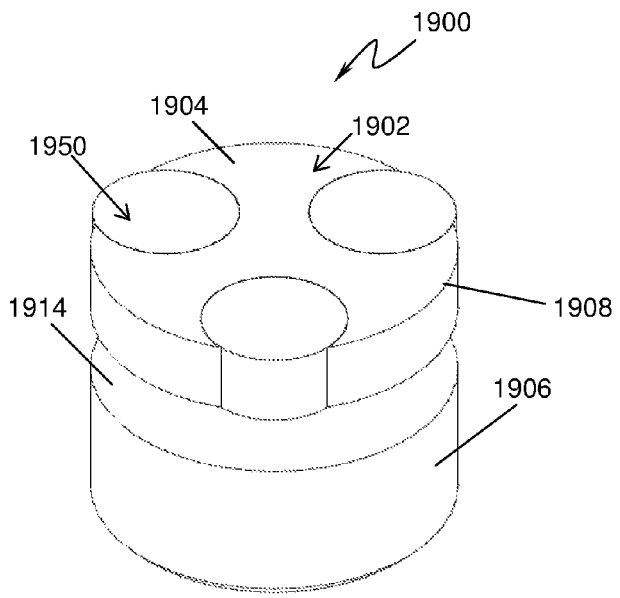
FIG. 53
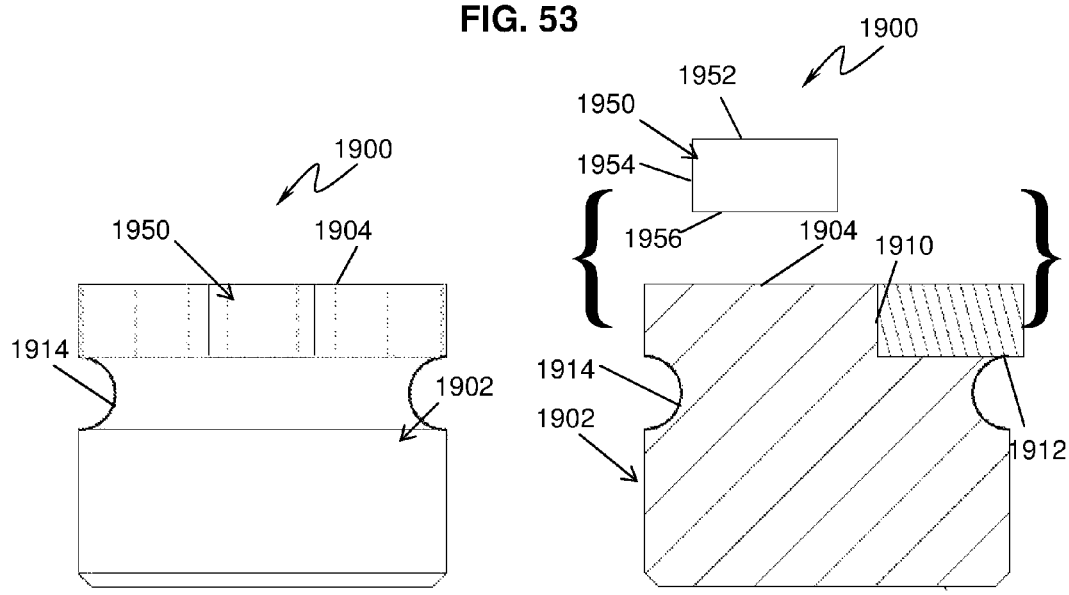
FIG. 54
FIG. 55

CUTTER ASSEMBLY WITH AT LEAST ONE ISLAND AND A METHOD OF MANUFACTURING A CUTTER ASSEMBLY

CROSS-REFERENCE TO RELATED APPLICATION

This application is a continuation of U.S. patent application Ser. No. 13/339,474 (now U.S. Pat. No. 9,303,462), filed Dec. 29, 2011.

FIELD

The present disclosure relates to a cutter assembly with at least one island. More particularly, the present disclosure relates a cutter assembly that can include a substrate and at least one island disposed in the substrate.

BACKGROUND

In the discussion of the background that follows, reference is made to certain structures and/or methods. However, the following references should not be construed as an admission that these structures and/or methods constitute prior art. Applicants expressly reserve the right to demonstrate that such structures and/or methods do not qualify as prior art.

Cutters can be subject to abrasion which can shorten the working life of the cutter. Thus, there is a need in the art for a cutter assembly that can provide higher abrasion resistance or longer cutter life.

SUMMARY

Exemplary embodiments provide a cutter assembly and a method of manufacturing a cutter assembly. The cutter assembly includes a substrate and at least one island. The substrate includes a surface circumscribed by a peripheral edge, a flank surface extending from the peripheral edge, and at least one pocket with an opening on the surface and spaced apart from the peripheral edge. The at least one pocket extends from the opening towards an interior of the substrate. The at least one island is in the at least one pocket, and the at least one island includes a cutting surface that is exposed by the opening of the at least one pocket.

In another construction, the cutter assembly includes a substrate and at least one island. The substrate includes a surface circumscribed by a peripheral edge, a flank surface extending from the peripheral edge, and at least one pocket with an opening on the surface and the flank surface. The at least one pocket extends from the opening towards an interior of the substrate, and the at least one island is in the at least one pocket so that the at least one island protrudes beyond the flank surface. The at least one island includes a cutting surface that is exposed by the opening of the at least one pocket.

In another construction, the cutter assembly includes a substrate and at least one island. The substrate includes a surface circumscribed by a peripheral edge, a flank surface extending from the peripheral edge, and at least one pocket disposed in the substrate away from the surface and the flank surface. The at least one island is disposed in the at least one pocket, and the at least one island includes a cutting surface.

The method of manufacturing a cutter assembly includes: providing at least one island; treating the at least one island; providing a substrate; forming a surface circumscribed by a peripheral edge on the substrate; forming at least one pocket with an opening disposed on the surface and spaced apart from the peripheral edge, the at least one pocket extending from the opening towards an interior of the substrate and having a shape that engages with the at least one island; disposing the at least one island in the at least one pocket; and coupling the at least one island to the at least one pocket.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which:

FIG. 20 is a perspective view of a cutter assembly with at least one island in accordance with an alternate construction.

FIG. 21 is a side view of the cutter assembly with at least one island shown in FIG. 20.

FIG. 22 is a sectional side view of the cutter assembly with at least one island shown in FIG. 20.

FIG. 26 is a perspective view of a cutter assembly with at least one island in accordance with an alternate construction.

FIG. 27 is a side view of the cutter assembly with at least one island shown in FIG. 26.

FIG. 28 is an exploded, sectional side view of the cutter assembly with at least one island shown in FIG. 26.

FIG. 29 is a perspective view of a cutter assembly with at least one island in accordance with an alternate construction.

FIG. 30 is a side view of the cutter assembly with at least one island shown in FIG. 29.

FIG. 31 is an exploded, sectional side view of the cutter assembly with at least one island shown in FIG. 29.

FIG. 32 is a perspective view of a cutter assembly with at least one island in accordance with an alternate construction.

FIG. 33 is a side view of the cutter assembly with at least one island shown in FIG. 32.

FIG. 34 is an exploded, sectional side view of the cutter assembly with at least one island shown in FIG. 32.

FIG. 44 is a perspective view of a cutter assembly with at least one island in accordance with an alternate construction.

FIG. 45 is a side view of the cutter assembly with at least one island shown in FIG. 44.

FIG. 46 is an exploded, sectional side view of the cutter assembly with at least one island shown in FIG. 44.

FIG. 47 is a perspective view of a cutter assembly with at least one island in accordance with an alternate construction.

FIG. 48 is a side view of the cutter assembly with at least one island shown in FIG. 47.

FIG. 49 is an exploded, sectional side view of the cutter assembly with at least one island shown in FIG. 47.

FIG. 50 is a perspective view of a cutter assembly with at least one island in accordance with an alternate construction.

FIG. 51 is a side view of the cutter assembly with at least one island shown in FIG. 50.

FIG. 52 is an exploded, sectional side view of the cutter assembly with at least one island shown in FIG. 50.

FIG. 53 is a perspective view of a cutter assembly with at least one island in accordance with an alternate construction.

FIG. 54 is a side view of the cutter assembly with at least one island shown in FIG. 53.

FIG. 55 is an exploded, sectional side view of the cutter assembly with at least one island shown in FIG. 53.

DETAILED DESCRIPTION

Figure 1:
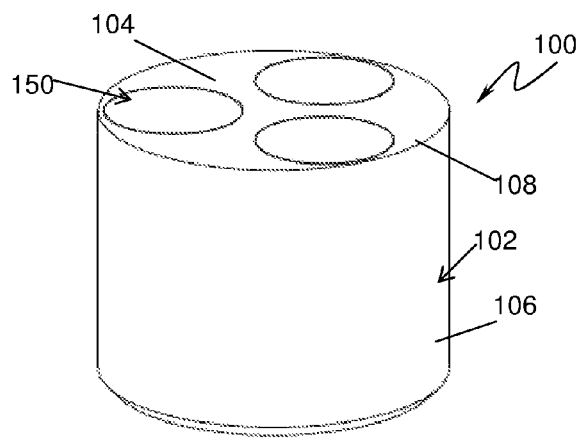
FIG. 1 is a perspective view of a cutter assembly with at least one island in accordance with an embodiment.
Figure 56:
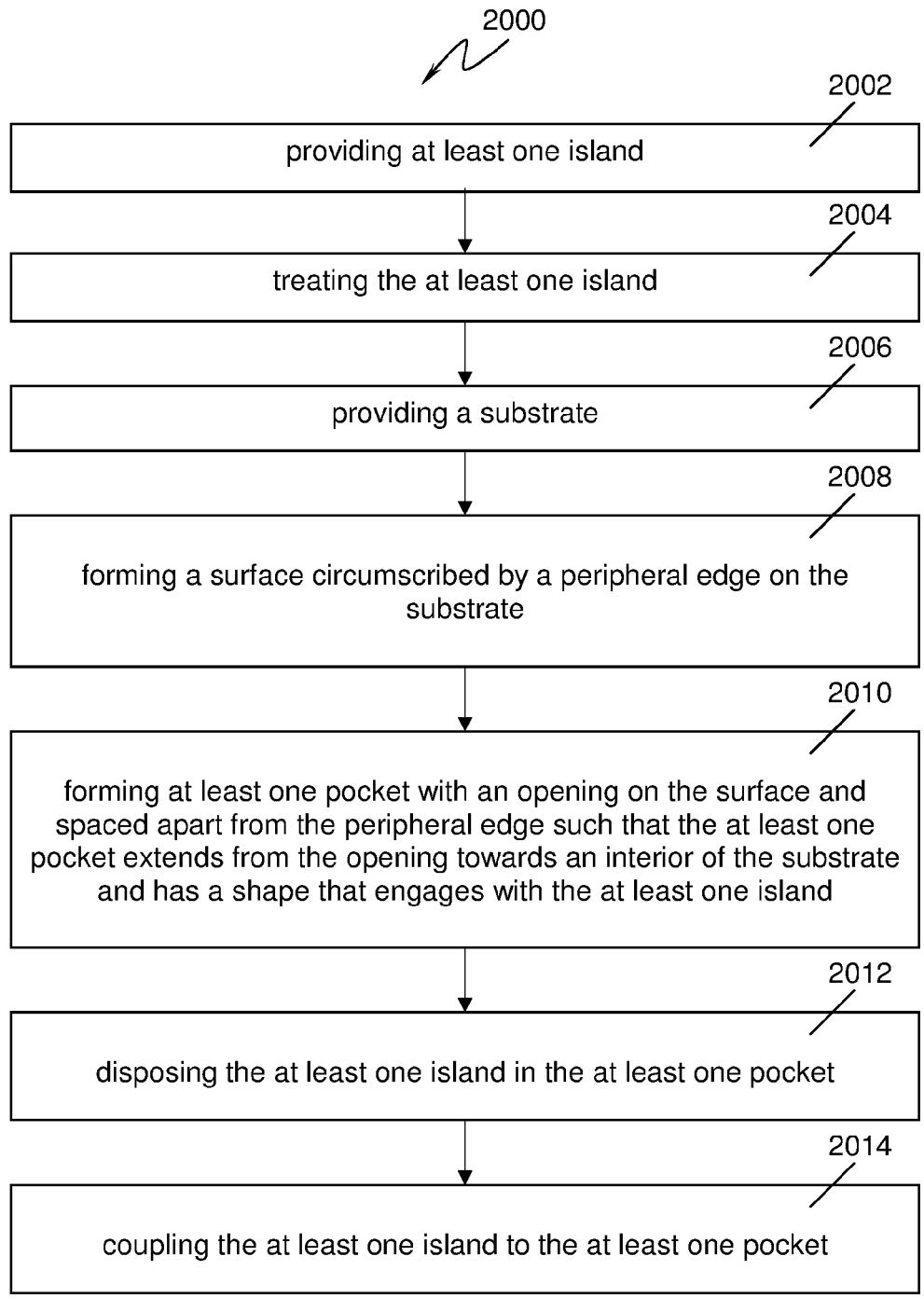
FIG. 56 is a flowchart of a method of manufacturing a cutter with at least one island in accordance with an embodiment.

Referring to FIGS. 1-56, embodiments can provide a cutter assembly 100, 200, 300, 400, 500, 600, 700, 800, 900, 1000, 1100, 1200, 1300, 1400, 1500, 1600, 1700, 1800, and 1900 with higher abrasion resistance, longer life, better toughness, and/or thermal stability. Embodiments can utilize, for example, fully leached polycrystalline diamond, which can have significantly better thermal stability up to approximately 1,000° C. When fully leached polycrystalline diamond is used and coupled with, for example, a cobalt-tungsten carbide, embodiments can also provide higher strength at the interface between fully leached polycrystalline diamond and cobalt-tungsten carbide. Embodiments can also provide a method of manufacturing a cutter assembly 100 . . . 1900, that includes, for example, a fully leached polycrystalline diamond, which is coupled to, for example, cobalt-tungsten carbide securely and economically.

The cutter assembly 100 . . . 1900 can comprise a substrate 102, 202, 302, 402, 502, 602, 702, 802, 902, 1002, 1102, 1202, 1302, 1402, 1502, 1602, 1702, 1802, and 1902 at least one island 150a, 150b, 250, 350, 450, 550, 650, 750, 850, 950, 1050, 1150, 1250, 1350, 1450, 1550, 1650, 1750, 1850, and 1950 disposed in the substrate 102 . . . 1902.

The at least one island 150a . . . 1950 can be disposed in the substrate 102 . . . 1902. The substrate 102 . . . 1902 can have a surface 104, 204, 304, 404, 504, 604, 704, 804, 904, 1004, 1104, 1204, 1304, 1404, 1504, 1604, 1704, 1804, and 1904. The surface 104 . . . 1904 can receive one or more of the islands 150a . . . 1950. In other constructions of the cutter assembly 100 . . . 1900, the substrate 102 . . . 1902 can have a plurality of surfaces 104 . . . 1904, and each one of the plurality of surfaces 104 . . . 1904 can receive one or more of the islands 150a . . . 1950.

The at least one island 150a . . . 1950 can be disposed in the substrate 102 . . . 1902 such that the at least one island 150a . . . 1950 is spaced apart from another island 150a . . . 1950.

The substrate 102 . . . 1902 can be made from tungsten carbide cobalt (WC—Co), a diamond-silicon carbide composite material, binderless carbide, or some other suitable materials. One example of a diamond-silicon carbide composite material is commercially available as VERSIMAX manufactured by Diamond Innovations, Inc., Worthington, Ohio USA. Binderless can refer to tungsten carbide composites with less amount of metal binder phase than a metal-WC composite cermet material, such as Co—WC composite cermet material, Ni—WC composite cermet material, Fe—WC composite cermet material, and the like. Examples of binderless carbide can include a cermet of tungsten carbide binded with a molybdenum metal and a low metal content of about 1 wt % to about 2 wt %. Binderless carbide can also include a type of tungsten carbide sintered with low metal content, such as about 1 wt % to about 2 wt %, and a binding phase that is mainly eta-phase ($Co_3W_3O_6$).

The at least one island 150a . . . 1950 can be made from polycrystalline diamond (PCD), diamond, cubic boron nitride (CBN), polycrystalline cubic boron nitride (PCBN), or a diamond-silicon carbide composite material. One example of a diamond-silicon carbide composite material is commercially available as VERSIMAX.

The at least one island 150a . . . 1950 can be a thermally stable material. However, in other constructions of the cutter assembly 100 . . . 1900, the at least one island 150a . . . 1950 can be made from a material that is thermally stable.

If the at least one island 150a . . . 1950 is made from PCD, the at least one island 150a . . . 1950 made from PCD can be fully leached, partially leached, or unleached. In a construction of the cutter assembly 100 that includes fully leached PCD, the cutter assembly 100 . . . 1900 can provide thermal stability.

The at least one island 150a . . . 1950 can be coated. The coating material can comprise a metal, a metal alloy, a compound of the metal and/or combination of series thereof. The metal may comprise tungsten, titanium, niobium, zirconium, tantalum, vanadium, chromium, or molybdenum. The coating can be applied upon at least a portion of the at least one island 150a . . . 1950 via a coating method that can comprise physical vapor deposition, chemical vapor deposition, sputtering, evaporation, electroless plating, electroplating, and/or combinations or series thereof. The coating layer can have a thickness of about 0.1 μm to about 100 μm.

The at least one island 150a . . . 1950 can have a casing. In some constructions of the cutter assembly 100 . . . 1900, the at least one island 150a . . . 1950 can be press fit into the casing. The casing can be a metal casing. The metal casing can provide a medium between the at least one island 150a . . . 1950 and the substrate 102 . . . 1902 and can help to manage the deformation and stress condition between the at least one island 150a . . . 1950 and the substrate 102 . . . 1902. The casing layer can have a thickness of about 0.1 μm to about 100 μm. In another embodiment the at least one island 150 . . . 1950 can be directly fitted into the substrate 102 . . . 1902, and thus, no casing may be needed.

The at least one island 150a . . . 1950 can be coupled to the substrate 102 . . . 1902. The at least one island 150a . . . 1950 can be coupled to the substrate 102 . . . 1902 by, for example, gluing, brazing, bonding, welding, clamping, mechanical locking, or some other suitable coupling. An embodiment can include a method for brazing an island. The method for brazing the island can comprise: brazing a coated island to a substrate, wherein the island material can comprise a cemented carbide, a polycrystalline cubic boron nitride (cBN) superabrasive, a ceramic, a metal, a metal alloy, and/or combinations thereof; a substrate; an optional coating layer, wherein the coating layer may be in direct contact with the island or the substrate, and the coating layer may be continuous or discontinuous. The brazing step can comprise: heating at least one of the braze metal, the coating layer, and the substrate, to a temperature above a liquidus temperature sufficient to melt the braze metal; and bringing the melted braze metal into contact with both the island and the substrate and optionally the coating to form a braze metal layer. The braze metal layer can comprise silver, copper, magnesium, nickel, zinc, palladium, chromium, boron, titanium, tin, silicon, or an alloy or composite thereof. The substrate can comprise a second island, and the second island materials can comprise a cemented carbide, a polycrystalline cubic boron nitride (cBN) superabrasive, a ceramic, a metal, a metal alloy, and/or combinations thereof. In an embodiment of the method, the first and second island material may each independently comprise a single crystal diamond, a chemical vapor deposition diamond, a silicon carbide bonded diamond composite, a cobalt-polycrystalline diamond composite, a thermally-stable diamond composite, and/or combinations thereof. In an embodiment of the method, the coating metal may comprise tungsten, titanium, niobium, zirconium, tantalum, vanadium, chromium, molybdenum and/or combinations thereof. In an embodiment of the method, the coating metal may comprise at least one refractory metal and, optionally, at least one non-refractory metal. In an embodiment of the method, the refractory metal carbide may comprise at least one metal of the refractory metal or the refractory metal alloy. In an embodiment of the method, the refractory metal layer may have a thickness of about 0.1 μm to about 100 μm. In an embodiment of the method, the brazing step may comprise applying a heat source to heat at least the braze metal to the temperature of from about 500° C. to about 1000° C. In an embodiment of the method, the heat source may be at least one of a torch, a furnace, a microwave device, an arc welder, a laser, or an induction coil. In an embodiment of the method, the heat source may be an induction coil; and the temperature is maintained from about 700° C. to about 900° C. for a time period of at least about 5 seconds. In an embodiment of the method, the brazing step may be performed under ambient air pressure and in air. In another embodiment of the method, the brazing step may be performed under flowing or stagnant inert protection gas or gas mixtures.

The substrate 102 . . . 1902 can have any suitable shape. For example, in FIGS. 1-13, 17-34, and 38-52, the substrate 102 . . . 402, 802 . . . 1302, and 1502 . . . 1802 can have a generally cylindrical shape. In other constructions of the cutter assembly 100 . . . 1900, the substrate 102 . . . 1902 can have a shape that is not generally cylindrical. For example, FIGS. 35-37 and 53-55 show a substrate 1402 and 1902 that includes a concavity.

The at least one island 150a . . . 1950 can have any suitable shape. As shown in FIGS. 1 to 13, 23-28, and 38-55, the at least one island 150, 250, 350, 450, 1050, 1150, 1550, 1650, 1750, 1850, and 1950 can have a generally cylindrical shape. As shown in FIGS. 14-19, the at least one island 550, 650, 750, and 850 can have a cross-sectional shape that is not substantially circular. As shown in FIGS. 29-37, the at least one island 1250, 1350, and 1450 can be have a ring shape or be a plurality of rings.

Turning to FIGS. 1-4, the cutter assembly 100 can have a substrate 102 with a generally cylindrical shape. The substrate 102 can have a surface 104. The surface 104 can be an end surface. The substrate 102 can also have a flank surface 106. The surface 104 can be substantially perpendicular to the flank surface 106. The flank surface 106 can meet the surface 104 so that a common boundary between the surface 104 and the flank surface 106 defines a peripheral edge 108 of the surface 104. The surface 104 can be a substantially planar surface. The flank surface 106 can provide the substrate 102 with a generally circular cross-sectional shape. In other embodiments, the substrate 102 can have a cross-sectional shape that can be triangular, can be similar to a polygon, and/or can have any regular or irregular shape besides circular.

The substrate 102 can include a pocket 110. The pocket 110 can have an opening 112. The opening 112 can be disposed on the surface 104 of the substrate 102. The pocket 110 can extend from the opening 112 on the surface 104 to an interior of the substrate 102. The pocket 110 can have a shape that can receive at least a portion of the at least one island 150.

Figure 2A:
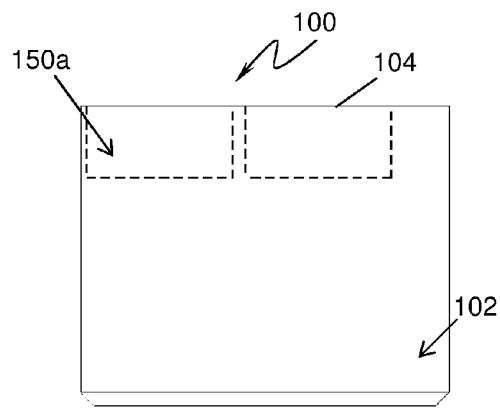
FIG. 2a is a side view of the cutter assembly with at least one island shown in FIG. 1 in accordance with an embodiment.
Figure 3A:
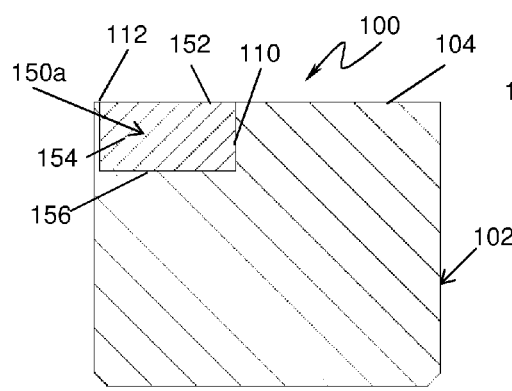
FIG. 3a is a sectional side view of the cutter assembly with at least one island shown in FIG. 1 in accordance with an embodiment.

Referring to FIGS. 2a and 3a, the at least one island 150a can have a generally cylindrical shape. The at least one island 150a can have an end surface 152, a flank surface 154, and an opposite end surface 156. The end surface 152 can be a planar surface that can be substantially perpendicular to the flank surface 154. The opposite end surface 156 can also be a planar surface that is substantially perpendicular to the flank surface 154. The at least one island 150a can be disposed in the pocket 110 of the substrate 102. The at least one island 150a can be disposed in the pocket 110 of the substrate 102 so that the end surface 152 of the at least one island 150a is substantially co-planar with surface 104 of the substrate 102, the flank surface 154 extends into the interior of the substrate 102, and the opposite end surface 156 is disposed within the interior of the substrate 102. The end surface 152 can be a cutting surface, or the end surface 152 and the flank surface 154 together can form a cutting surface.

Figure 2B:
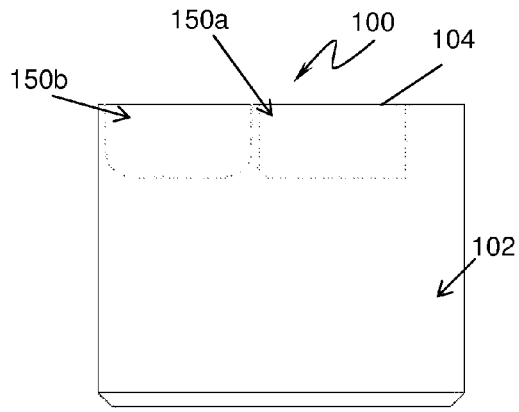
FIG. 2b is a side view of a cutter assembly with at last one island shown in FIG. 1 in accordance with another embodiment.
Figure 3B:
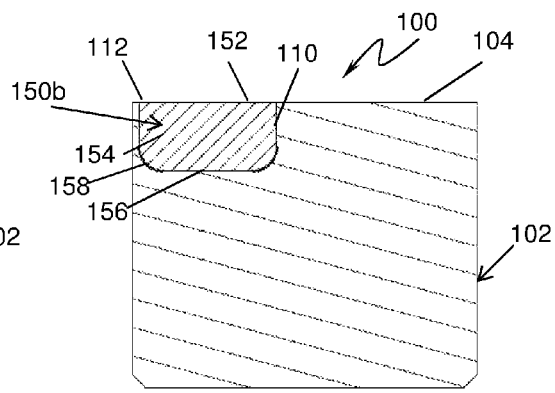
FIG. 3b is a sectional side view of the cutter assembly with at least one island shown in FIG. 1 in accordance with another embodiment.
Figure 4:
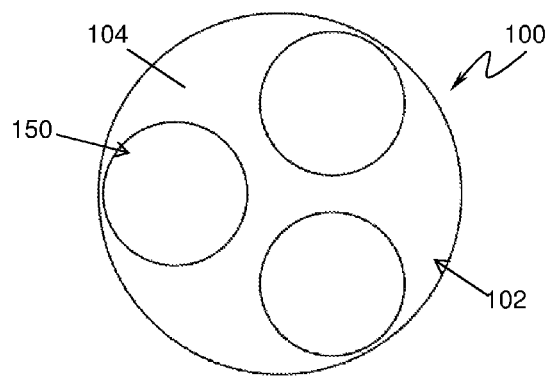
FIG. 4 is a top view of the cutter assembly with at least one island shown in FIG. 1.

Referring to FIGS. 2b and 3b, the at least one island 150b can have a generally cylindrical shape. The at least one island 150b can have an end surface 152, a flank surface 154, and an opposite end surface 156. However, unlike the at least one island 150a, the at least one island 150b can also include an edge 158. The edge 158 can be rounded or a chamfer. The edge 150 can relieve stress. The end surface 152 can be a planar surface that can be substantially perpendicular to the flank surface 154. The opposite end surface 156 can also be a planar surface that is substantially perpendicular to the flank surface 154. The at least one island 150b can be disposed in the pocket 110 of the substrate 102. The at least one island 150b can be disposed in the pocket 110 of the substrate 102 so that the end surface 152 of the at least one island 150a is substantially co-planar with surface 104 of the substrate 102, the flank surface 154 extends into the interior of the substrate 102, and the opposite end surface 156 is disposed within the interior of the substrate 102. Because the at least one island 150b can include the edge 158, the pocket 110 can include a complementary shape that can receive the edge 158. The end surface 152 can be a cutting surface, or the end surface 152 and the flank surface 154 together can form a cutting surface.

In the construction shown in FIGS. 1-4, there are three islands 150 spaced equally apart from each other and equidistant from a center of the surface 104. However, in other constructions, there may be more or less than the three islands 150 shown. Also, the exact position of each of the island 150 with respect to each other or the center of the surface 104 can be different from that shown in FIGS. 1-4. Also, the exact size of the islands 150 can be different. The exact number and size of islands 150 and the exact position for each of the islands 150 can depend on, for example, the application of the cutter assembly 100.

Figure 5:
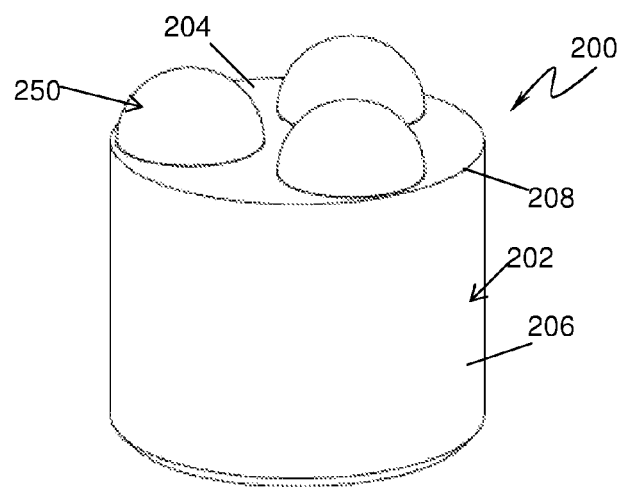
FIG. 5 is a perspective view of a cutter assembly with at least one island of an alternate construction.
Figure 6:
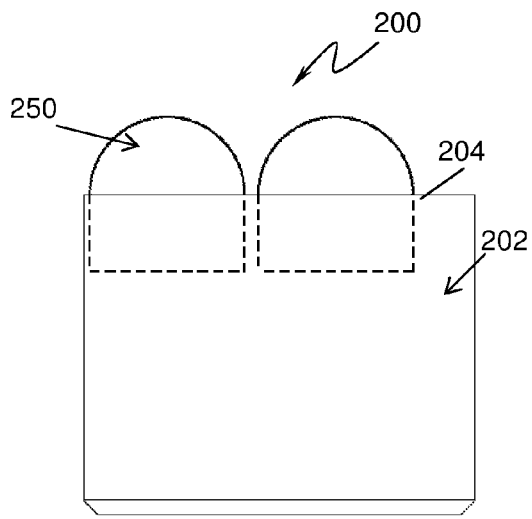
FIG. 6 is a side view of the cutter assembly with at least one island of an alternate construction shown in FIG. 5.
Figure 7:
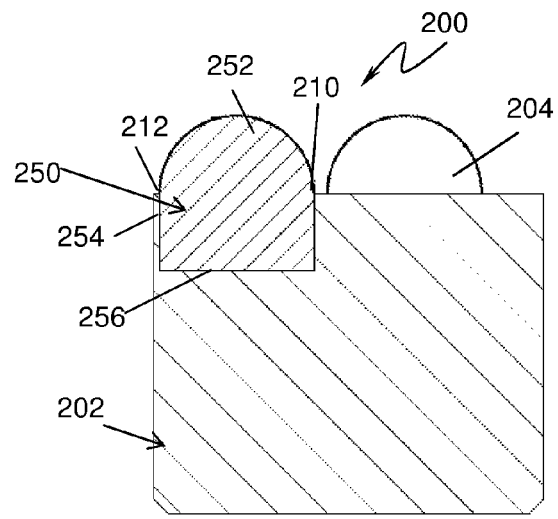
FIG. 7 is a sectional side view of the cutter assembly with at least one island of an alternate construction shown in FIG. 5.

Turning to FIGS. 5-7, the cutter assembly 200 can have a substrate 202 with a generally cylindrical shape. The substrate 202 can have a surface 204. The surface 204 can be an end surface. The substrate 202 can also have a flank surface 206. The surface 204 can be substantially perpendicular to the flank surface 206. The flank surface 206 can meet the surface 204 so that a common boundary between the surface 204 and the flank surface 206 defines a peripheral edge 208 of the surface 204. The surface 204 can be a substantially planar surface. The flank surface 206 can provide the substrate 202 with a generally circular cross-sectional shape. In other embodiments, the substrate 202 can have a cross-sectional shape that can be triangular, can be similar to a polygon, and/or can have any regular or irregular shape besides circular.

The substrate 202 can include a pocket 210. The pocket 210 can have an opening 212. The opening 212 can be disposed on the surface 204 of the substrate 202. The pocket 210 can extend from the opening 212 on the surface 204 to an interior of the substrate 202. The pocket 210 can have a shape that can receive at least a portion of the at least one island 250.

The at least one island 250 can have a generally cylindrical shape. The at least one island 250 can have an end surface 252, a flank surface 254, and an opposite end surface 256. Unlike the at least one island 150 shown in FIGS. 1-4, the end surface 252 can include a dome shape. The opposite end surface 256 can be a planar surface that can be substantially perpendicular to the flank surface 254. The at least one island 250 can be disposed in the pocket 210 of the substrate 202. The at least one island 250 can be disposed in the pocket 210 of the substrate 202 so that the end surface 252 of the at least one island 250 protrudes away from the surface 204 of the substrate 202 and away from the interior of the substrate 202, the flank surface 254 extends into the interior of the substrate 202, and the opposite end surface 256 is disposed within the interior of the substrate 202. The end surface 252 can be a cutting surface, or the end surface 252 and the flank surface 254 together can form a cutting surface.

In the construction shown in FIGS. 5-7, there are three islands 250 spaced equally apart from each other and equidistant from a center of the surface 204. However, in other constructions, there may be more or less than the three islands 250 shown. Also, the exact position of each of the island 250 with respect to each other or the center of the surface 204 can be different from that shown in FIGS. 5-7. Also, the exact size of the islands 250 can be different. The exact number and size of islands 250 and the exact position for each of the islands 250 can depend on, for example, the application of the cutter assembly 200.

Figure 8:
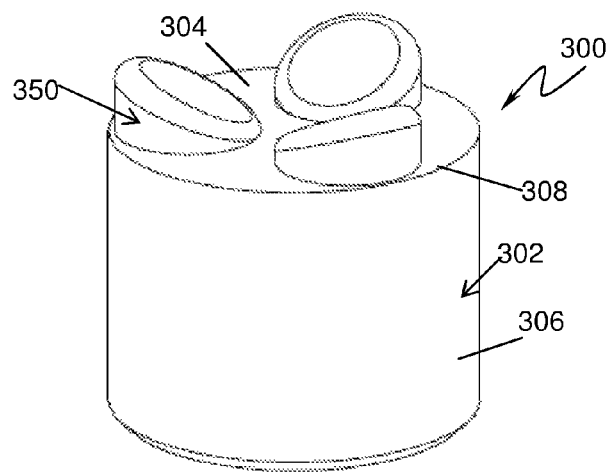
FIG. 8 is a perspective view of a cutter assembly with at least one island of an alternate construction.
Figure 9:
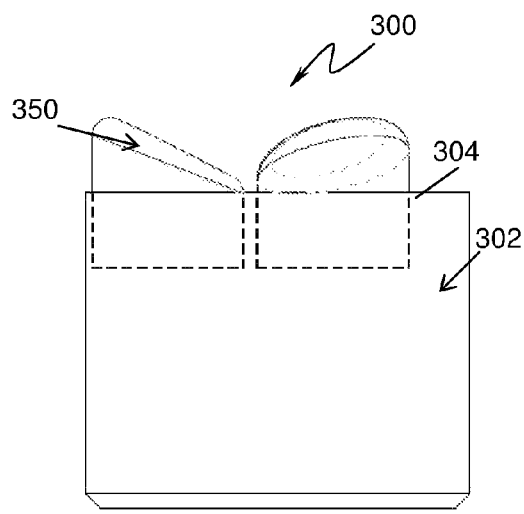
FIG. 9 is a side view of the cutter assembly with at least one island of an alternate construction shown in FIG. 8.
Figure 10:
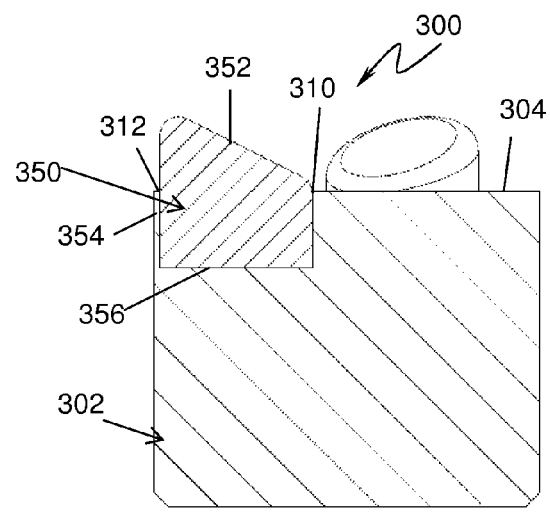
FIG. 10 is a sectional side view of the cutter assembly with at least one island of an alternate construction shown in FIG. 8.

Turning to FIGS. 8-10, the cutter assembly 300 can have a substrate 302 with a generally cylindrical shape. The substrate 302 can have a surface 304. The surface 304 can be an end surface. The substrate 302 can also have a flank surface 306. The surface 304 can be substantially perpendicular to the flank surface 306. The flank surface 306 can meet the surface 304 so that a common boundary between the surface 304 and the flank surface 306 defines a peripheral edge 308 of the surface 304. The surface 304 can be a substantially planar surface. The flank surface 306 can provide the substrate 302 with a generally circular cross-sectional shape. In other embodiments, the substrate 302 can have a cross-sectional shape that can be triangular, can be similar to a polygon, and/or can have any regular or irregular shape besides circular.

The substrate 302 can include a pocket 310. The pocket 310 can have an opening 312. The opening 312 can be disposed on the surface 304 of the substrate 302. The pocket 310 can extend from the opening 312 on the surface 304 to an interior of the substrate 302. The pocket 310 can have a shape that can receive at least a portion of the at least one island 350.

The at least one island 350 can have a generally cylindrical shape. The at least one island 350 can have an end surface 352, a flank surface 354, and an opposite end surface 356. Unlike the at least one island 150 shown in FIGS. 1-4, the end surface 352 can include be a planar surface that is at an angle with respect to the flank surface 354 and not generally perpendicular to the flank surface 354. The end surface 352 can be angled such that its planar surface slopes downward toward a center of the surface 304. The opposite end surface 356 can be a planar surface that can be substantially perpendicular to the flank surface 354. The at least one island 350 can be disposed in the pocket 310 of the substrate 302. The at least one island 350 can be disposed in the pocket 310 of the substrate 302 so that the end surface 352 of the at least one island 350 protrudes away from the surface 304 of the substrate 302 and away from the interior of the substrate 302, the flank surface 354 extends into the interior of the substrate 302, and the opposite end surface 356 is disposed within the interior of the substrate 302. The end surface 352 can be a cutting surface, or the end surface 352 and the flank surface 354 together can form a cutting surface.

In the construction shown in FIGS. 8-10, there are three islands 350 spaced equally apart from each other and equidistant from a center of the surface 304. However, in other constructions, there may be more or less than the three islands 350 shown. Also, the exact position of each of the island 350 with respect to each other or the center of the surface 304 can be different from that shown in FIGS. 8-10. Also, the exact size of the islands 350 can be different. The exact number and size of islands 350 and the exact position for each of the islands 350 can depend on, for example, the application of the cutter assembly 300.

Figure 11:
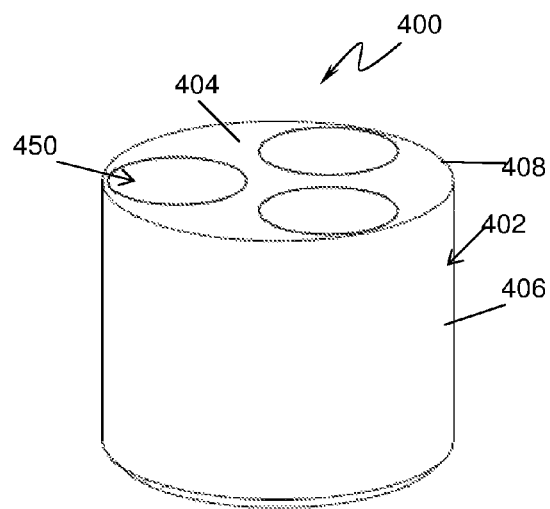
FIG. 11 is a perspective view of a cutter assembly with at least one island of an alternate construction.
Figure 12:
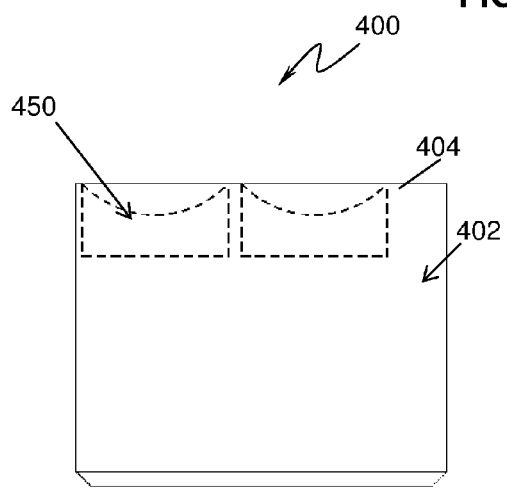
FIG. 12 is a side view of the cutter assembly with at least one island of an alternate construction shown in FIG. 11.
Figure 13:
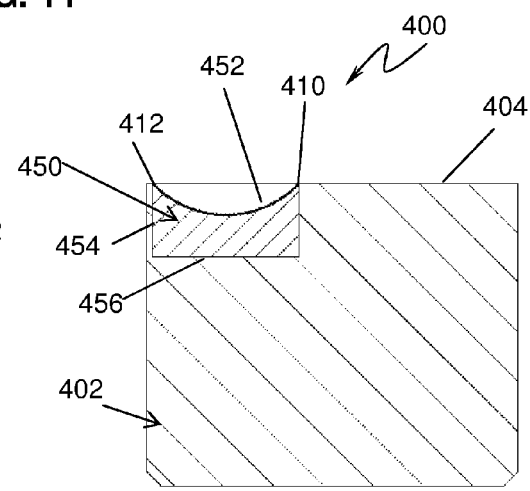
FIG. 13 is a sectional side view of the cutter assembly with at least one island of an alternate construction shown in FIG. 11.

Turning to FIGS. 11-13, the cutter assembly 400 can have a substrate 402 with a generally cylindrical shape. The substrate 402 can have a surface 404. The surface 404 can be an end surface. The substrate 402 can also have a flank surface 406. The surface 404 can be substantially perpendicular to the flank surface 406. The flank surface 406 can meet the surface 404 so that a common boundary between the surface 404 and the flank surface 406 defines a peripheral edge 408 of the surface 404. The surface 404 can be a substantially planar surface. The flank surface 406 can provide the substrate 402 with a generally circular cross-sectional shape. In other embodiments, the substrate 402 can have a cross-sectional shape that can be triangular, can be similar to a polygon, and/or can have any regular or irregular shape besides circular.

The substrate 402 can include a pocket 410. The pocket 410 can have an opening 412. The opening 412 can be disposed on the surface 404 of the substrate 402. The pocket 410 can extend from the opening 412 on the surface 404 to an interior of the substrate 402. The pocket 410 can have a shape that can receive at least a portion of the at least one island 450.

The at least one island 450 can have a generally cylindrical shape. The at least one island 450 can have an end surface 452, a flank surface 454, and an opposite end surface 456. Unlike the at least one island 150 shown in FIGS. 1-4, the end surface 452 can include a concavity that curves toward the opposite surface 456. The opposite end surface 456 can be a planar surface that can be substantially perpendicular to the flank surface 454. The at least one island 450 can be disposed in the pocket 410 of the substrate 402. The at least one island 450 can be disposed in the pocket 410 of the substrate 402 so that the end surface 452 of the at least one island 450 protrudes away from the surface 404 of the substrate 402 and towards the interior of the substrate 402, the flank surface 454 extends into the interior of the substrate 402, and the opposite end surface 456 is disposed within the interior of the substrate 402. The end surface 452 can be a cutting surface, or the end surface 452 and the flank surface 454 together can form a cutting surface.

In the construction shown in FIGS. 11-13, there are three islands 450 spaced equally apart from each other and equidistant from a center of the surface 404. However, in other constructions, there may be more or less than the three islands 450 shown. Also, the exact position of each of the island 450 with respect to each other or the center of the surface 404 can be different from that shown in FIGS. 11-13. Also, the exact size of the islands 450 can be different. The exact number and size of islands 450 and the exact position for each of the islands 450 can depend on, for example, the application of the cutter assembly 400.

Figure 14:
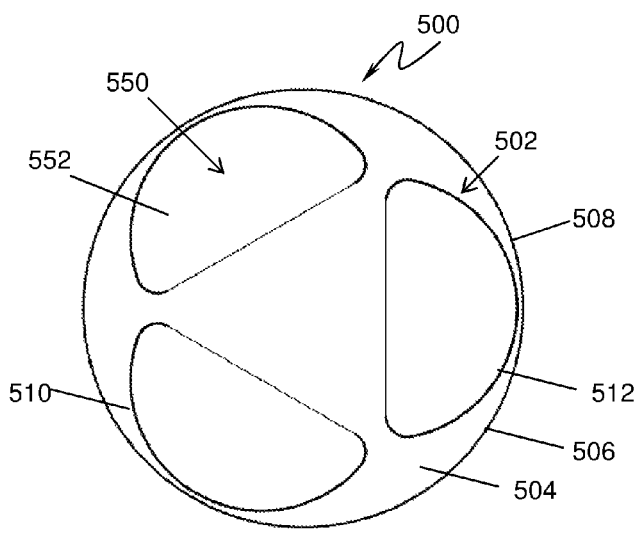
FIG. 14 is a top view of a cutter assembly with at least one island of an alternate construction.

Turning to FIG. 14, the cutter assembly 500 can have a substrate 502 with a generally cylindrical shape. The substrate 502 can have a surface 504. The surface 504 can be an end surface. The substrate 502 can also have a flank surface 506. The surface 504 can be substantially perpendicular to the flank surface 506. The flank surface 506 can meet the surface 504 so that a common boundary between the surface 504 and the flank surface 506 defines a peripheral edge 508 of the surface 504. The surface 504 can be a substantially planar surface. The flank surface 506 can provide the substrate 502 with a generally circular cross-sectional shape. In other embodiments, the substrate 502 can have a cross-sectional shape that can be triangular, can be similar to a polygon, and/or can have any regular or irregular shape besides circular.

The substrate 502 can include a pocket 510. The pocket 510 can have an opening 512. The opening 512 can be disposed on the surface 504 of the substrate 502. The pocket 510 can extend from the opening 512 on the surface 504 to an interior of the substrate 502. The pocket 510 can have a shape that can receive at least a portion of the at least one island 550.

The at least one island 550 can have a generally cylindrical shape. The at least one island 550 can have an end surface 552, a flank surface, and an opposite end surface. Unlike the at least one island 150 shown in FIGS. 1-4, the at least one island 550 can have a cross-sectional shape that can be generally semi-circular. The at least one island 550 can be disposed in the pocket 510 of the substrate 502. The at least one island 550 can be disposed in the pocket 510 of the substrate 502 so that the end surface 552 can be generally co-planar with the surface 504 of the substrate 502, the flank surface extends into the interior of the substrate 502, and the opposite end surface is disposed within the interior of the substrate 502. The end surface 552 can alternatively have a convexity such that the end surface 552 can protrude from the surface 504 of the substrate 502. In a further alternative, the end surface 552 can have a concavity such that the end surface 552 can sag from the surface 504 toward an interior of the substrate 502. The end surface 552 can be a cutting surface, or the end surface 552 and the flank surface together can form a cutting surface.

In the construction shown in FIG. 14, there are three islands 550 spaced equally apart from each other and equidistant from a center of the surface 504. However, in other constructions, there may be more or less than the three islands 550 shown. Also, the exact position of each of the island 550 with respect to each other or the center of the surface 504 can be different from that shown in FIG. 14. Also, the exact size of the islands 550 can be different. The exact number and size of islands 550 and the exact position for each of the islands 550 can depend on, for example, the application of the cutter assembly 500.

Figure 15:
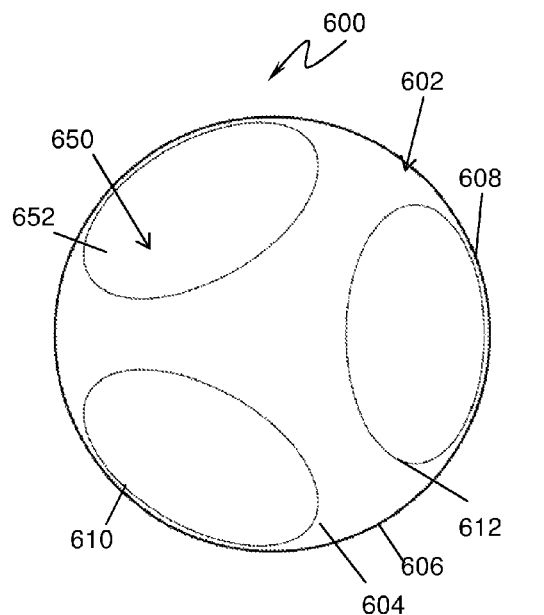
FIG. 15 is a top view of a cutter assembly with at least one island of an alternate construction.

Turning to FIG. 15, the cutter assembly 600 can have a substrate 602 with a generally cylindrical shape. The substrate 602 can have a surface 604. The surface 604 can be an end surface. The substrate 602 can also have a flank surface 606. The surface 604 can be substantially perpendicular to the flank surface 606. The flank surface 606 can meet the surface 604 so that a common boundary between the surface 604 and the flank surface 606 defines a peripheral edge 608 of the surface 604. The surface 604 can be a substantially planar surface. The flank surface 606 can provide the substrate 602 with a generally circular cross-sectional shape. In other embodiments, the substrate 602 can have a cross-sectional shape that can be triangular, can be similar to a polygon, and/or can have any regular or irregular shape besides circular.

The substrate 602 can include a pocket 610. The pocket 610 can have an opening 612. The opening 612 can be disposed on the surface 604 of the substrate 602. The pocket 610 can extend from the opening 612 on the surface 604 to an interior of the substrate 602. The pocket 610 can have a shape that can receive at least a portion of the at least one island 650.

The at least one island 650 can have a generally cylindrical shape. The at least one island 650 can have an end surface 652, a flank surface, and an opposite end surface. Unlike the at least one island 150 shown in FIGS. 1-4, the at least one island 650 can have a cross-sectional shape that can be generally ovalular. The at least one island 650 can be disposed in the pocket 610 of the substrate 602. The at least one island 650 can be disposed in the pocket 610 of the substrate 602 so that the end surface 652 can be generally co-planar with the surface 604 of the substrate 602, the flank surface extends into the interior of the substrate 602, and the opposite end surface is disposed within the interior of the substrate 602. The end surface 652 can alternatively have a convexity such that the end surface 652 can protrude from the surface 604 of the substrate 602. In a further alternative, the end surface 652 can have a concavity such that the end surface 652 can sag from the surface 604 toward an interior of the substrate 602. The end surface 652 can be a cutting surface, or the end surface 652 and the flank surface together can form a cutting surface.

In the construction shown in FIG. 15, there are three islands 650 spaced equally apart from each other and equidistant from a center of the surface 604. However, in other constructions, there may be more or less than the three islands 650 shown. Also, the exact position of each of the island 650 with respect to each other or the center of the surface 604 can be different from that shown in FIG. 15. Also, the exact size of the islands 650 can be different. The exact number and size of islands 650 and the exact position for each of the islands 650 can depend on, for example, the application of the cutter assembly 600.

Figure 16:
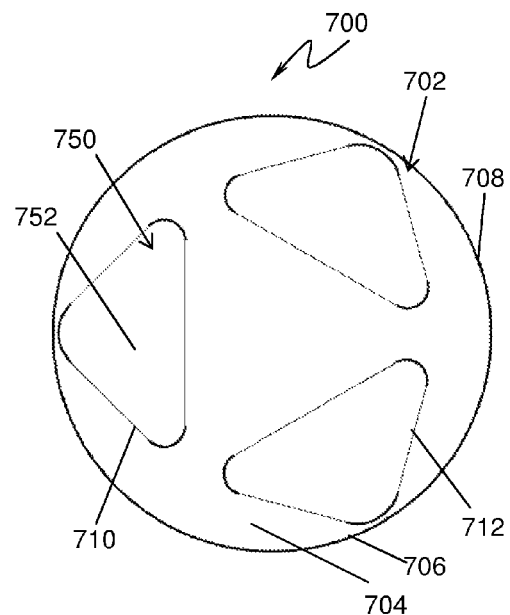
FIG. 16 is a top view of a cutter assembly with at least one island of an alternate construction.

Turning to FIG. 16 the cutter assembly 700 can have a substrate 702 with a generally cylindrical shape. The substrate 702 can have a surface 704. The surface 704 can be an end surface. The substrate 702 can also have a flank surface 706. The surface 704 can be substantially perpendicular to the flank surface 706. The flank surface 706 can meet the surface 704 so that a common boundary between the surface 704 and the flank surface 706 defines a peripheral edge 708 of the surface 704. The surface 704 can be a substantially planar surface. The flank surface 706 can provide the substrate 702 with a generally circular cross-sectional shape. In other embodiments, the substrate 702 can have a cross-sectional shape that can be triangular, can be similar to a polygon, and/or can have any regular or irregular shape besides circular.

The substrate 702 can include a pocket 710. The pocket 710 can have an opening 712. The opening 712 can be disposed on the surface 704 of the substrate 702. The pocket 710 can extend from the opening 712 on the surface 704 to an interior of the substrate 702. The pocket 710 can have a shape that can receive at least a portion of the at least one island 750.

The at least one island 750 can have a generally cylindrical shape. The at least one island 750 can have an end surface 752, a flank surface, and an opposite end surface. Unlike the at least one island 150 shown in FIGS. 1-4, the at least one island 750 can have a cross-sectional shape that can be generally triangular. In other embodiments, the at least one island 750 can have a cross-sectional shape that can be similar to a polygon, and/or can have any regular or irregular shape. The at least one island 750 can be disposed in the pocket 710 of the substrate 702. The at least one island 750 can be disposed in the pocket 710 of the substrate 702 so that the end surface 752 can be generally co-planar with the surface 704 of the substrate 702, the flank surface extends into the interior of the substrate 702, and the opposite end surface is disposed within the interior of the substrate 702. The end surface 752 can alternatively have a convexity such that the end surface 752 can protrude from the surface 704 of the substrate 702. In a further alternative, the end surface 752 can have a concavity such that the end surface 752 can sag from the surface 704 toward an interior of the substrate 702. The end surface 752 can be a cutting surface, or the end surface 752 and the flank surface together can form a cutting surface.

In the construction shown in FIG. 16, there are three islands 750 spaced equally apart from each other and equidistant from a center of the surface 704. However, in other constructions, there may be more or less than the three islands 750 shown. Also, the exact position of each of the island 750 with respect to each other or the center of the surface 704 can be different from that shown in FIG. 16. Also, the exact size of the islands 750 can be different. The exact number and size of islands 750 and the exact position for each of the islands 750 can depend on, for example, the application of the cutter assembly 700.

Figure 17:
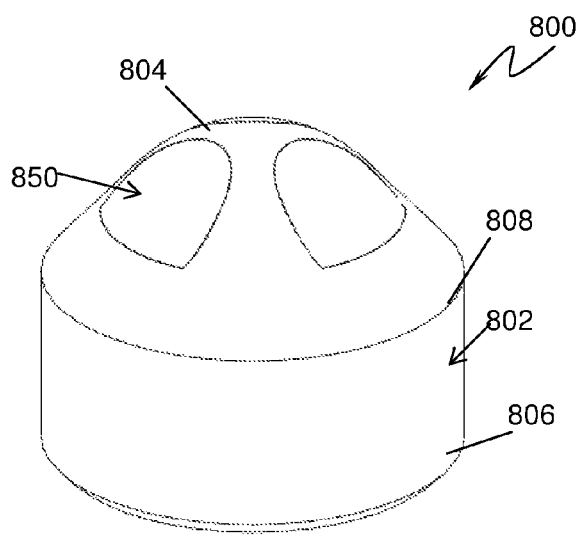
FIG. 17 is a perspective view of a cutter assembly with at least one island in accordance with an alternate construction.
Figure 18:
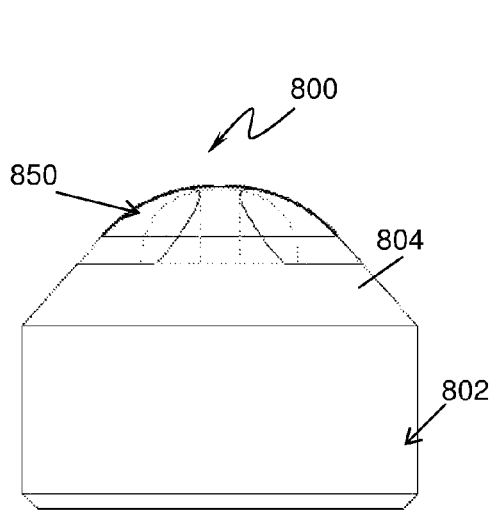
FIG. 18 is a side view of the cutter assembly with at least one island shown in FIG. 17.
Figure 19:
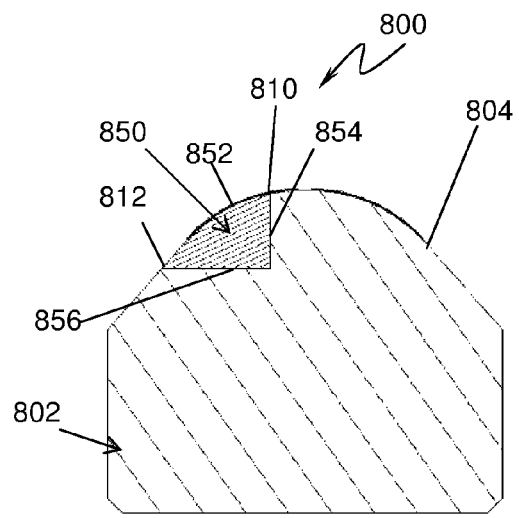
FIG. 19 is a sectional side view of the cutter assembly with at least one island shown in FIG. 17.

Turning to FIGS. 17-19, the cutter assembly 800 can have a substrate 802 with a generally cylindrical shape. The substrate 802 can have a surface 804. The surface 804 can be an end surface. The substrate 802 can also have a flank surface 806. The flank surface 806 can meet the surface 804 so that a common boundary between the surface 804 and the flank surface 806 defines a peripheral edge 808 of the surface 804. The flank surface 806 can provide the substrate 802 with a generally circular cross-sectional shape. In other embodiments, the substrate 802 can have a cross-sectional shape that can be triangular, can be similar to a polygon, and/or can have any regular or irregular shape besides circular.

The substrate 802 can include a pocket 810. The pocket 810 can have an opening 812. The opening 812 can be disposed on the surface 804 of the substrate 802. The pocket 810 can extend from the opening 812 on the surface 804 to an interior of the substrate 802. The pocket 810 can have a shape that can receive at least a portion of the at least one island 850.

The at least one island 850 can have a generally cylindrical shape. The at least one island 850 can have an end surface 852, a flank surface 854, and an opposite end surface 856. Unlike the cutter assembly 100 shown in FIGS. 1-4, the surface 804 of the substrate 802 and the end surface 852 can together form a shape protruding away from the center of the substrate 802. Because the end surface 852 can slope downwards, the end surface 852 can meet the opposite end surface 856, and thus, the flank surface 854 may not extend the entire periphery of the end surface 852. The opposite end surface 856 can be a planar surface that is substantially perpendicular to the flank surface 854. The at least one island 850 can be disposed in the pocket 810 of the substrate 802. The at least one island 850 can be disposed in the pocket 810 of the substrate 802 so that the end surface 852 of the at least one island 850 is substantially co-planar with surface 804 of the substrate 802, the flank surface 854 extends into the interior of the substrate 802, and the opposite end surface 856 is disposed within the interior of the substrate 802. The end surface 852 can alternatively have a convexity such that the end surface 852 can protrude from the surface 804 of the substrate 802. In a further alternative, the end surface 852 can have a concavity such that the end surface 852 can sag from the surface 804 toward an interior of the substrate 802. The end surface 852 can be a cutting surface, or the end surface 852 and the flank surface 854 together can form a cutting surface.

In the construction shown in FIGS. 17-19, there are three islands 850 spaced equally apart from each other and equidistant from a center of the surface 804. However, in other constructions, there may be more or less than the three islands 850 shown. Also, the exact position of each of the island 850 with respect to each other or the center of the surface 804 can be different from that shown in FIGS. 17-19. Also, the exact size of the islands 850 can be different. The exact number and size of islands 850 and the exact position for each of the islands 850 can depend on, for example, the application of the cutter assembly 800.

Turning to FIGS. 20-22, the cutter assembly 900 can have a substrate 902 with a generally cylindrical shape. The substrate 902 can have a surface 904. The surface 904 can be an end surface. The substrate 902 can also have a flank surface 906. The flank surface 906 can meet the surface 904 so that a common boundary between the surface 904 and the flank surface 906 defines a peripheral edge 908 of the surface 904. The flank surface 906 can provide the substrate 902 with a generally circular cross-sectional shape. In other embodiments, the substrate 902 can have a cross-sectional shape that can be triangular, can be similar to a polygon, and/or can have any regular or irregular shape besides circular.

The substrate 902 can include a pocket 910. The pocket 910 can have an opening 912. The opening 912 can be disposed on the surface 904 of the substrate 902. The pocket 910 can extend from the opening 912 on the surface 904 to an interior of the substrate 902. The pocket 910 can have a shape that can receive at least a portion of the at least one island 950.

The at least one island 950 can have a generally cylindrical shape. The at least one island 950 can have an end surface 952, a flank surface 954, and an opposite end surface 956. Unlike the cutter assembly 100 shown in FIGS. 1-4, the surface 904 of the substrate 902 and the end surface 952 can together form a shape protruding away from the center of the substrate 902. Also, the surface 904 and the end surface 952 protrude less from the center of the substrate 902 than the cutter assembly 800 shown in FIGS. 17-19. Because the end surface 952 can slope downwards, the end surface 952 can meet the opposite end surface 956, and thus, the flank surface 954 may not extend the entire periphery of the end surface 952. The opposite end surface 956 can be a planar surface that is substantially perpendicular to the flank surface 954. The at least one island 950 can be disposed in the pocket 910 of the substrate 902. The at least one island 950 can be disposed in the pocket 910 of the substrate 902 so that the end surface 952 of the at least one island 950 is substantially co-planar with surface 904 of the substrate 902, the flank surface 954 extends into the interior of the substrate 902, and the opposite end surface 956 is disposed within the interior of the substrate 902. The end surface 952 can alternatively have a convexity such that the end surface 952 can protrude from the surface 904 of the substrate 902. In a further alternative, the end surface 952 can have a concavity such that the end surface 952 can sag from the surface 904 toward an interior of the substrate 902. The end surface 952 can be a cutting surface, or the end surface 952 and the flank surface 954 together can form a cutting surface.

In the construction shown in FIGS. 20-22, there are three islands 950 spaced equally apart from each other and equidistant from a center of the surface 904. However, in other constructions, there may be more or less than the three islands 950 shown. Also, the exact position of each of the island 950 with respect to each other or the center of the surface 904 can be different from that shown in FIGS. 20-22. Also, the exact size of the islands 950 can be different. The exact number and size of islands 950 and the exact position for each of the islands 950 can depend on, for example, the application of the cutter assembly 900.

Figure 23:
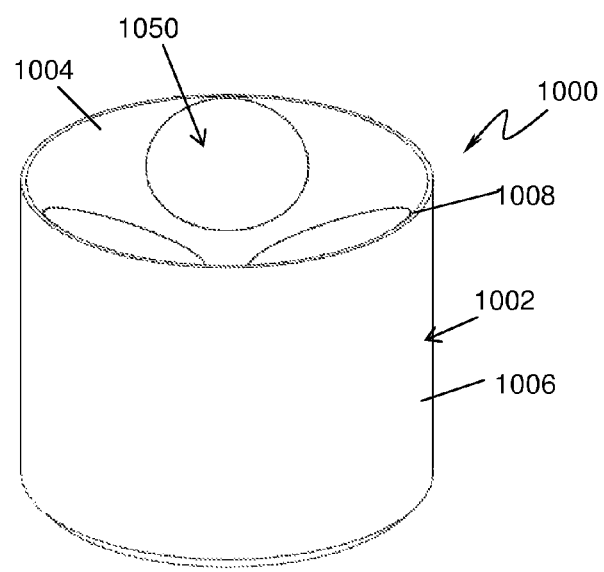
FIG. 23 is a perspective view of a cutter assembly with at least one island in accordance with an alternate construction.
Figure 24:
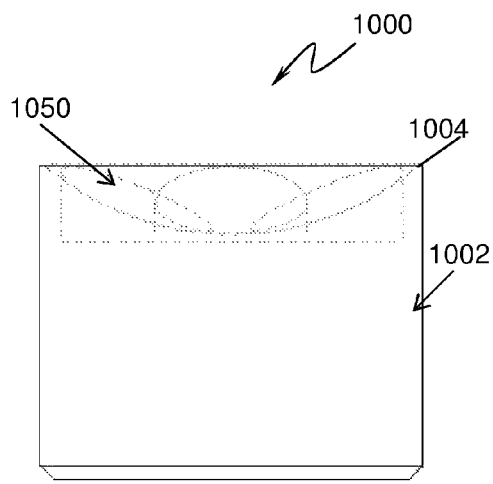
FIG. 24 is a side view of the cutter assembly with at least one island shown in FIG. 23.
Figure 25:
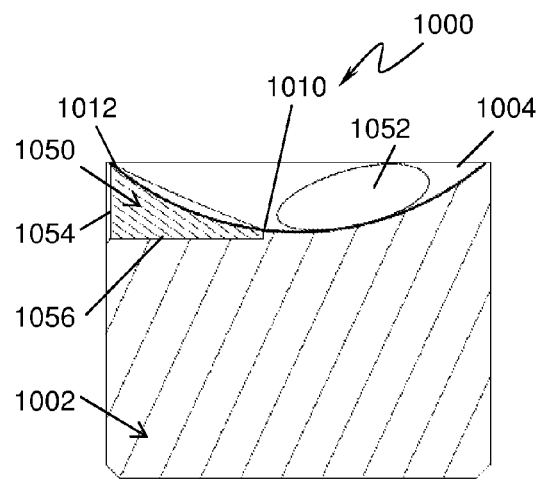
FIG. 25 is a sectional side view of the cutter assembly with at least one island shown in FIG. 23.

Turning to FIGS. 23-25, the cutter assembly 1000 can have a substrate 1002 with a generally cylindrical shape. The substrate 1002 can have a surface 1004. The surface 1004 can be an end surface. The substrate 1002 can also have a flank surface 1006. The flank surface 1006 can meet the surface 1004 so that a common boundary between the surface 1004 and the flank surface 1006 defines a peripheral edge 1008 of the surface 1004. The flank surface 1006 can provide the substrate 1002 with a generally circular cross-sectional shape. In other embodiments, the substrate 1002 can have a cross-sectional shape that can be triangular, can be similar to a polygon, and/or can have any regular or irregular shape besides circular.

The substrate 1002 can include a pocket 1010. The pocket 1010 can have an opening 1012. The opening 1012 can be disposed on the surface 1004 of the substrate 1002. The pocket 1010 can extend from the opening 1012 on the surface 1004 to an interior of the substrate 1002. The pocket 1010 can have a shape that can receive at least a portion of the at least one island 1050.

The at least one island 1050 can have a generally cylindrical shape. The at least one island 1050 can have an end surface 1052, a flank surface 1054, and an opposite end surface 1056. Unlike the cutter assembly 100 shown in FIGS. 1-4, the surface 1004 of the substrate 1002 and the end surface 1052 can together form a shape protruding towards the center of the substrate 1002. Because the end surface 1052 can slope downwards, the end surface 1052 can meet the opposite end surface 1056, and thus, the flank surface 1054 may not extend the entire periphery of the end surface 1052. The opposite end surface 1056 can be a planar surface that is substantially perpendicular to the flank surface 1054. The at least one island 1050 can be disposed in the pocket 1010 of the substrate 1002. The at least one island 1050 can be disposed in the pocket 1010 of the substrate 1002 so that the end surface 1052 of the at least one island 1050 is substantially co-planar with surface 1004 of the substrate 1002, the flank surface 1054 extends into the interior of the substrate 1002, and the opposite end surface 1056 is disposed within the interior of the substrate 1002. The end surface 1052 can alternatively have a convexity such that the end surface 1052 can protrude from the surface 1004 of the substrate 1002. In a further alternative, the end surface 1052 can have a concavity such that the end surface 1052 can sag from the surface 1004 toward an interior of the substrate 1002. The end surface 1052 can be a cutting surface, or the end surface 1052 and the flank surface 1054 together can form a cutting surface.

In the construction shown in FIGS. 23-25, there are three islands 1050 spaced equally apart from each other and equidistant from a center of the surface 1004. However, in other constructions, there may be more or less than the three islands 1050 shown. Also, the exact position of each of the island 1050 with respect to each other or the center of the surface 1004 can be different from that shown in FIGS. 23-25. Also, the exact size of the islands 1050 can be different. The exact number and size of islands 1050 and the exact position for each of the islands 1050 can depend on, for example, the application of the cutter assembly 1000.

Turning to FIGS. 26-28, the cutter assembly 1100 can have a substrate 1102 with a generally cylindrical shape. The substrate 1102 can have a surface 1104. The surface 1104 can be an end surface. The surface 1104 can be a substantially planar surface. The substrate 1102 can also have a flank surface 1106. The surface 1104 can be substantially perpendicular to the flank surface 1106. The flank surface 1106 can meet the surface 1104 so that a common boundary between the surface 1104 and the flank surface 1106 defines a peripheral edge 1108 of the surface 1104. The flank surface 1106 can provide the substrate 1102 with a generally circular cross-sectional shape. In other embodiments, the substrate 1102 can have a cross-sectional shape that can be triangular, can be similar to a polygon, and/or can have any regular or irregular shape besides circular.

The substrate 1102 can include a pocket 1110. The pocket 1110 can have an opening 1112. The opening 1112 can be disposed on the surface 1104 of the substrate 1102. The pocket 1110 can extend from the opening 1112 on the surface 1104 to an opposite opening 1114 on an opposite end surface 1116 of the substrate 1102. The pocket 1110 can have a shape that can receive at least a portion of the at least one island 1150.

The at least one island 1150 can have a generally truncated conical shape. The at least one island 1150 can have an end surface 1152, a flank surface 1154, and an opposite end surface 1156. Unlike the cutter assembly 100 shown in FIGS. 1-4, the end surface 1152 can be larger than opposite end surface 1156 so that the flank surface 1154 is disposed at an angle with respect to the end surface 1152. The at least one island 1150 can be disposed in the pocket 1110 of the substrate 1102. The at least one island 1150 can be disposed in the pocket 1110 of the substrate 1102 so that the end surface 1152 of the at least one island 1150 is substantially co-planar with surface 1104 of the substrate 1102, the flank surface 1154 extends to the opposite end surface 1116 of the interior of the substrate 1102, and the opposite end surface 1156 is substantially coplanar with opposite end surface 1116. The end surface 1152 can alternatively have a convexity such that the end surface 1152 can protrude from the surface 1104 of the substrate 1102. In a further alternative, the end surface 1152 can have a concavity such that the end surface 1152 can sag from the surface 1104 toward an interior of the substrate 1102. The end surface 1152 can be a cutting surface, or the end surface 1152 and the flank surface 1154 together can form a cutting surface.

In the construction shown in FIGS. 26-28, there are three islands 1150 spaced equally apart from each other and equidistant from a center of the surface 1104. However, in other constructions, there may be more or less than the three islands 1150 shown. Also, the exact position of each of the island 1150 with respect to each other or the center of the surface 1104 can be different from that shown in FIGS. 26-28. Also, the exact size of the islands 1150 can be different. The exact number and size of islands 1150 and the exact position for each of the islands 1150 can depend on, for example, the application of the cutter assembly 1100.

Turning to FIGS. 29-31, the cutter assembly 1200 can have a substrate 1202 with a generally cylindrical shape. The substrate 1202 can have a surface 1204. The surface 1204 can be an end surface. The surface 1204 can be a substantially planar surface. The substrate 1202 can also have a flank surface 1206. The surface 1204 can be substantially perpendicular to the flank surface 1206. The flank surface 1206 can provide the substrate 1202 with a generally circular cross-sectional shape. In other embodiments, the substrate 1202 can have a cross-sectional shape that can be triangular, can be similar to a polygon, and/or can have any regular or irregular shape besides circular. However, the surface 1204 and the flank surface 1206 may not meet. Instead, the substrate 1202 can include a pocket 1210 so that the flank surface 1206 can extend to one side of an opening 1212 for a pocket 1210, and the surface 1204 can form another side of the opening 1212 for the pocket 1210. The pocket 1210 can extend from the opening 1212 towards an interior of the substrate 1202. The pocket 1210 can have a shape that can receive at least a portion of the at least one island 1250.

The at least one island 1250 can have a generally ring-like shape. The at least one island 1250 can have an end surface 1252, a flank surface 1254, and an opposite end surface 1256. The flank surface 1254 can be substantially perpendicular to the end surface 1252, the opposite end surface 1256, or both. Unlike the cutter assembly 100 shown in FIGS. 1-4, the at least one island can include a second flank surface 1258. The second flank surface 1258 can be substantially perpendicular to the end surface 1252, the opposite end surface 1256, or both. The at least one island 1250 can be disposed in the pocket 1210 of the substrate 1202. The at least one island 1250 can be disposed in the pocket 1210 of the substrate 1202 so that the end surface 1252 of the at least one island 1250 can be substantially co-planar with surface 1204 of the substrate 1202, the flank surface 1254 can extend between the flank surface 1206 of the substrate 1202 and the surface 1250, the opposite end surface 1256 can be disposed in the pocket 1210, and the second flank surface 1256 can be disposed in the pocket 1210. The end surface 1252 can alternatively have a convexity such that the end surface 1252 can protrude from the surface 1204 of the substrate 1202. In a further alternative, the end surface 1252 can have a concavity such that the end surface 1252 can sag from the surface 1204 toward an interior of the substrate 1202. The end surface 1252 can be a cutting surface, or the end surface 1252 and the flank surface 1254 together can form a cutting surface.

In the construction shown in FIGS. 29-31, there is one island 1250 disposed equidistant from a center of the surface 1204. However, in other constructions, there may be more or less than the one island 1250 shown. Also, the exact position of the island 1250 with respect to the center of the surface 1204 can be different from that shown in FIGS. 29-31. Also, the exact size of the islands 1250 can be different. The exact number and size of islands 1250 and the exact position for each of the islands 1250 can depend on, for example, the application of the cutter assembly 1200.

Turning to FIGS. 32-34, the cutter assembly 1300 can have a substrate 1302 with a generally cylindrical shape. The substrate 1302 can have a surface 1304. The surface 1304 can be an end surface. The surface 1304 can be a substantially planar surface. The substrate 1302 can also have a flank surface 1306. The surface 1304 can be substantially perpendicular to the flank surface 1306. The flank surface 1306 can meet the surface 1304 so that a common boundary between the surface 1304 and the flank surface 1306 defines a peripheral edge 1308 of the surface 1304. The flank surface 1306 can provide the substrate 1302 with a generally circular cross-sectional shape. In other embodiments, the substrate 1302 can have a cross-sectional shape that can be triangular, can be similar to a polygon, and/or can have any regular or irregular shape besides circular.

The substrate 1302 can include one or more pockets 1310. The one or more pockets 1310 can each have an opening 1312. The openings 1312 can be disposed on the surface 1304 of the substrate 1302. The openings 1312 can be disposed such that one of the openings 1312 is surrounded by another of the openings 1312. The one or more pockets 1310 can extend from the openings 1312 on the surface 1304 to an interior of the substrate 1302. The one or more pockets 1310 can have a shape that can receive at least a portion of the at least one island 1350.

The at least one island 1350 can have a generally ring-like shape. The at least one island 1350 can have an end surface 1352, a flank surface 1354, and an opposite end surface 1356. The flank surface 1354 can be substantially perpendicular to the end surface 1352, the opposite end surface 1356, or both. Unlike the cutter assembly 100 shown in FIGS. 1-4, the at least one island can include a second flank surface 1358. The second flank surface 1358 can be substantially perpendicular to the end surface 1352, the opposite end surface 1356, or both. The at least one island 1350 can be disposed in the one or more pockets 1310 of the substrate 1302. The at least one island 1350 can be disposed in the one or more pockets 1310 of the substrate 1302 so that the end surface 1352 of the at least one island 1350 can be substantially co-planar with surface 1304 of the substrate 1302, the flank surface 1354 and the second flank surface 1358 can extend into an interior of the substrate 1302, and the opposite end surface 1356 can be disposed in the one or more pockets 1310. The end surface 1352 can alternatively have a convexity such that the end surface 1352 can protrude from the surface 1304 of the substrate 1302. In a further alternative, the end surface 1352 can have a concavity such that the end surface 1352 can sag from the surface 1304 toward an interior of the substrate 1302. The end surface 1352 can be a cutting surface, or the end surface 1352 and the flank surface 1354 together can form a cutting surface.

In the construction shown in FIGS. 32-34, there are two islands 1350 disposed concentrically with respect to a center of the surface 1304. However, in other constructions, there may be more or less than the two islands 1350 shown. Also, the exact position of the islands 1350 with respect to the center of the surface 1304 can be different from that shown in FIGS. 32-34. Also, the exact size of the islands 1350 can be different. The exact number and size of islands 1350 and the exact position for each of the islands 1350 can depend on, for example, the application of the cutter assembly 1300.

Figure 35:
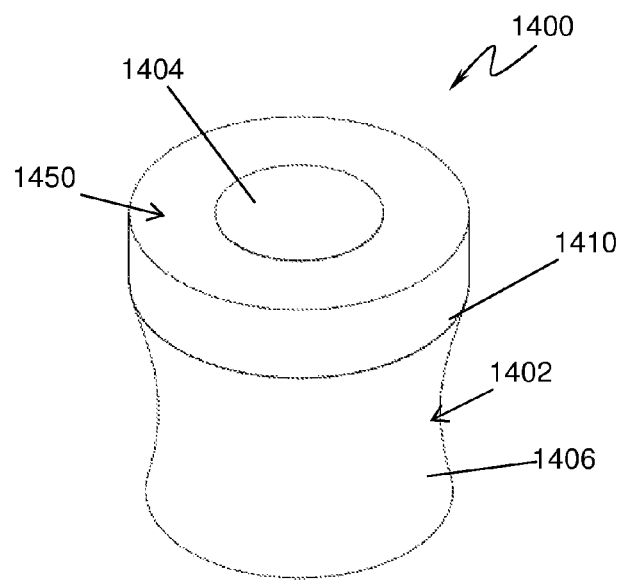
FIG. 35 is a perspective view of a cutter assembly with at least one island in accordance with an alternate construction.
Figures 36, 37:
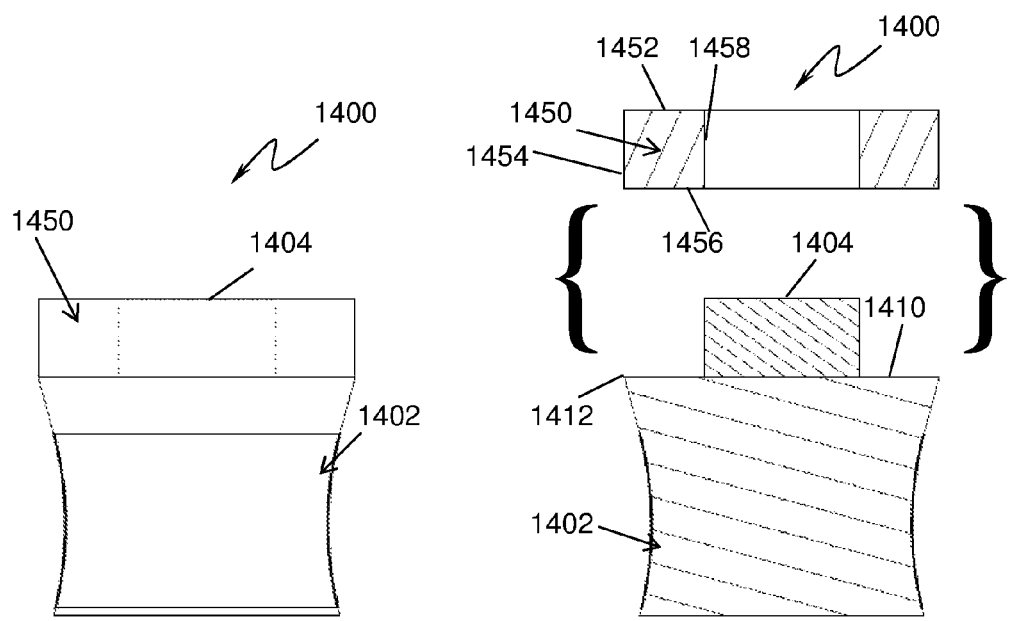
FIG. 36 is a side view of the cutter assembly with at least one island shown in FIG. 35.
FIG. 37 is an exploded, sectional side view of the cutter assembly with at least one island shown in FIG. 35.

Turning to FIGS. 35-37, the cutter assembly 1400 can have a substrate 1402 with a generally cylindrical shape. The substrate 1402 can have a surface 1404. The surface 1404 can be an end surface. The surface 1404 can be a substantially planar surface. The substrate 1402 can also have a flank surface 1406. The flank surface 1406 can include a concavity that curves towards an interior of the substrate 1402 or bulges away from the substrate 1402. The flank surface 1406 can provide the substrate 1402 with a generally circular cross-sectional shape. In other embodiments, the substrate 1402 can have a cross-sectional shape that can be triangular, can be similar to a polygon, and/or can have any regular or irregular shape besides circular. However, the surface 1404 and the flank surface 1406 may not meet. Instead, the substrate 1402 can include a pocket 1410 so that the flank surface 1406 can extend to one side of an opening 1412 for a pocket 1410, and the surface 1404 can form another side of the opening 1412 for the pocket 1410. The pocket 1410 can extend from the opening 1412 towards an interior of the substrate 1402. The pocket 1410 can have a shape that can receive at least a portion of the at least one island 1450.

The at least one island 1450 can have a generally ring-like shape. The at least one island 1450 can have an end surface 1452, a flank surface 1454, and an opposite end surface 1456. The flank surface 1454 can be substantially perpendicular to the end surface 1452, the opposite end surface 1456, or both. Unlike the cutter assembly 100 shown in FIGS. 1-4, the at least one island can include a second flank surface 1458. The second flank surface 1458 can be substantially perpendicular to the end surface 1452, the opposite end surface 1456, or both. The at least one island 1450 can be disposed in the pocket 1410 of the substrate 1402. The at least one island 1450 can be disposed in the pocket 1410 of the substrate 1402 so that the end surface 1452 of the at least one island 1450 can be substantially co-planar with surface 1404 of the substrate 1402, the flank surface 1454 can extend between the flank surface 1406 of the substrate 1402 and the surface 1450, the opposite end surface 1456 can be disposed in the pocket 1410, and the second flank surface 1456 can be disposed in the pocket 1410. The end surface 1452 can alternatively have a convexity such that the end surface 1452 can protrude from the surface 1404 of the substrate 1402. In a further alternative, the end surface 1452 can have a concavity such that the end surface 1452 can sag from the surface 1404 toward an interior of the substrate 1402. The end surface 1452 can be a cutting surface, or the end surface 1452 and the flank surface 1454 together can form a cutting surface.

In the construction shown in FIGS. 35-37, there is one island 1450 disposed equidistant from a center of the surface 1404. However, in other constructions, there may be more or less than the one island 1450 shown. Also, the exact position of the island 1450 with respect to the center of the surface 1404 can be different from that shown in FIGS. 35-37. Also, the exact size of the islands 1450 can be different. The exact number and size of islands 1450 and the exact position for each of the islands 1450 can depend on, for example, the application of the cutter assembly 1400.

Figure 38:
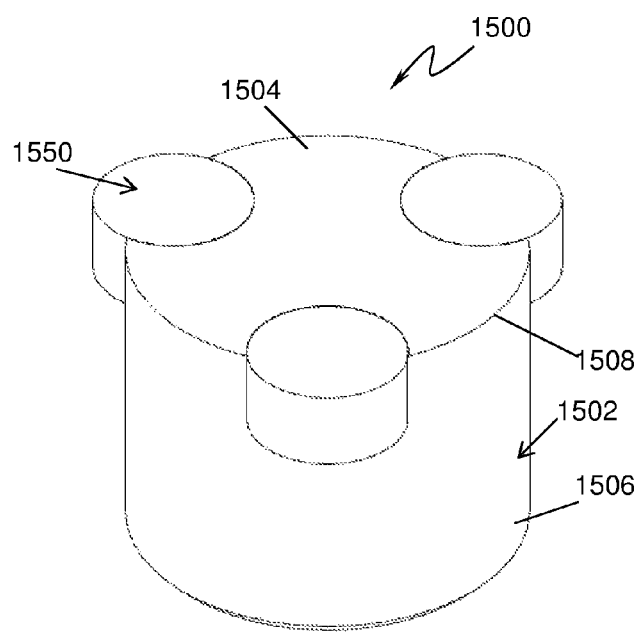
FIG. 38 is a perspective view of a cutter assembly with at least one island in accordance with an alternate construction.
Figures 39, 40:
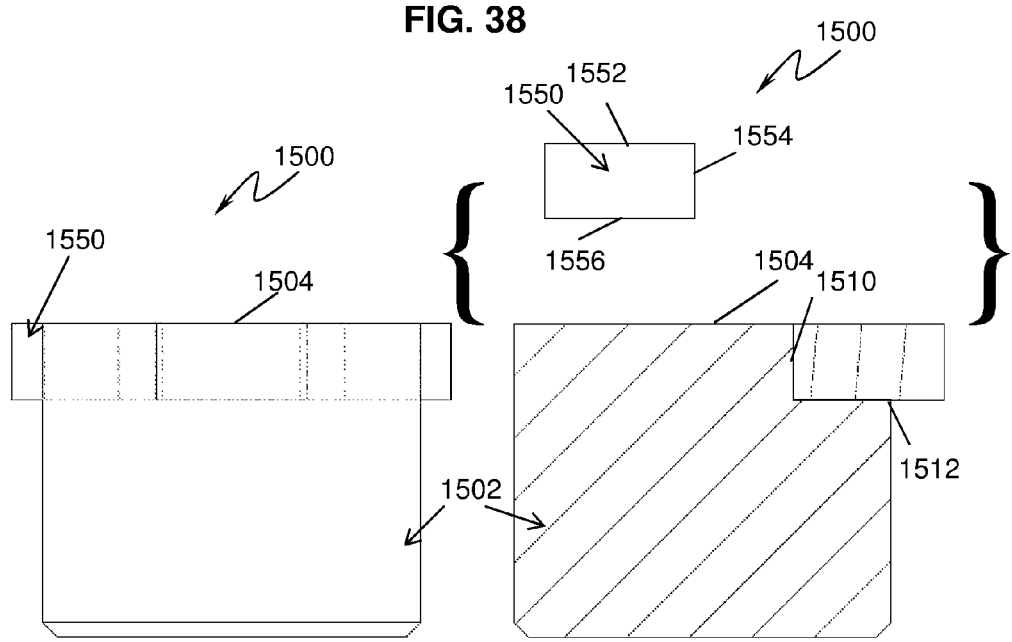
FIG. 39 is a side view of the cutter assembly with at least one island shown in FIG. 38.
FIG. 40 is an exploded, sectional side view of the cutter assembly with at least one island shown in FIG. 38.

Turning to FIGS. 38-40, the cutter assembly 1500 can have a substrate 1502 with a generally cylindrical shape. The substrate 1502 can have a surface 1504. The surface 1504 can be an end surface. The substrate 1502 can also have a flank surface 1506. The surface 1504 can be substantially perpendicular to the flank surface 1506. The flank surface 1506 can meet the surface 1504 so that a common boundary between the surface 1504 and the flank surface 1506 defines a peripheral edge 1508 of the surface 1504. The surface 1504 can be a substantially planar surface. The flank surface 1506 can provide the substrate 1502 with a generally circular cross-sectional shape. In other embodiments, the substrate 1502 can have a cross-sectional shape that can be triangular, can be similar to a polygon, and/or can have any regular or irregular shape besides circular.

The substrate 1502 can include a pocket 1510. The pocket 1510 can have an opening 1512. The opening 1512 can be disposed on the surface 1504, the edge 1508, and the flank surface 1506 of the substrate 1502. The pocket 1510 can extend from the opening 1512 on the surface 1504, the edge 1508, and the flank surface 1506 to an interior of the substrate 1502. The pocket 1510 can have a shape that can receive at least a portion of the at least one island 1550.

The at least one island 1550 can have a generally cylindrical shape. The at least one island 1550 can have an end surface 1552, a flank surface 1554, and an opposite end surface 1556. The end surface 1552 can be a planar surface that can be substantially perpendicular to the flank surface 1554. The opposite end surface 1556 can also be a planar surface that is substantially perpendicular to the flank surface 1554. The at least one island 1550 can be disposed in the pocket 1510 of the substrate 1502. The at least one island 1550 can be disposed in the pocket 1510 of the substrate 1502 so that the end surface 1552 of the at least one island 1550 is substantially co-planar with surface 1504 of the substrate 1502, the flank surface 1554 extends into the interior of the substrate 1502 and protrudes beyond the flank surface 1506 of the substrate 1502, and the opposite end surface 1556 is at least partially disposed within the interior of the substrate 1502. The end surface 1552 can alternatively have a convexity such that the end surface 1552 can protrude from the surface 1504 of the substrate 1502. In a further alternative, the end surface 1552 can have a concavity such that the end surface 1552 can sag from the surface 1504 toward an interior of the substrate 1502. The end surface 1552 can be a cutting surface, or the end surface 1552 and the flank surface 1554 together can form a cutting surface.

In the construction shown in FIGS. 38-40, there are three islands 1550 spaced equally apart from each other and equidistant from a center of the surface 1504. However, in other constructions, there may be more or less than the two islands 1550 shown. Also, the exact position of the islands 1550 with respect to each other or the center of the surface 1504 can be different from that shown in FIGS. 38-40. Also, the exact size of the islands 1550 can be different. The exact number and size of islands 1550 and the exact position for each of the islands 1550 can depend on, for example, the application of the cutter assembly 1500.

Figure 41:
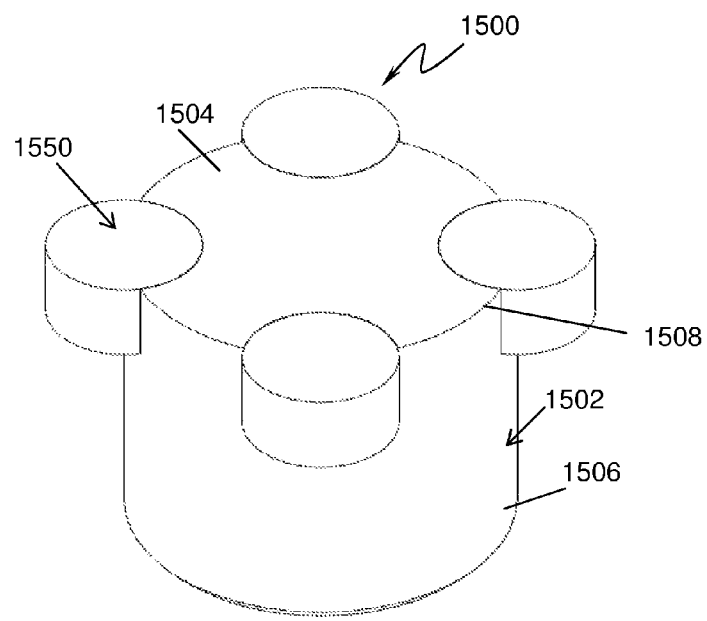
FIG. 41 is a perspective view of a cutter assembly with at least one island in accordance with an alternate construction.
Figures 42, 43:
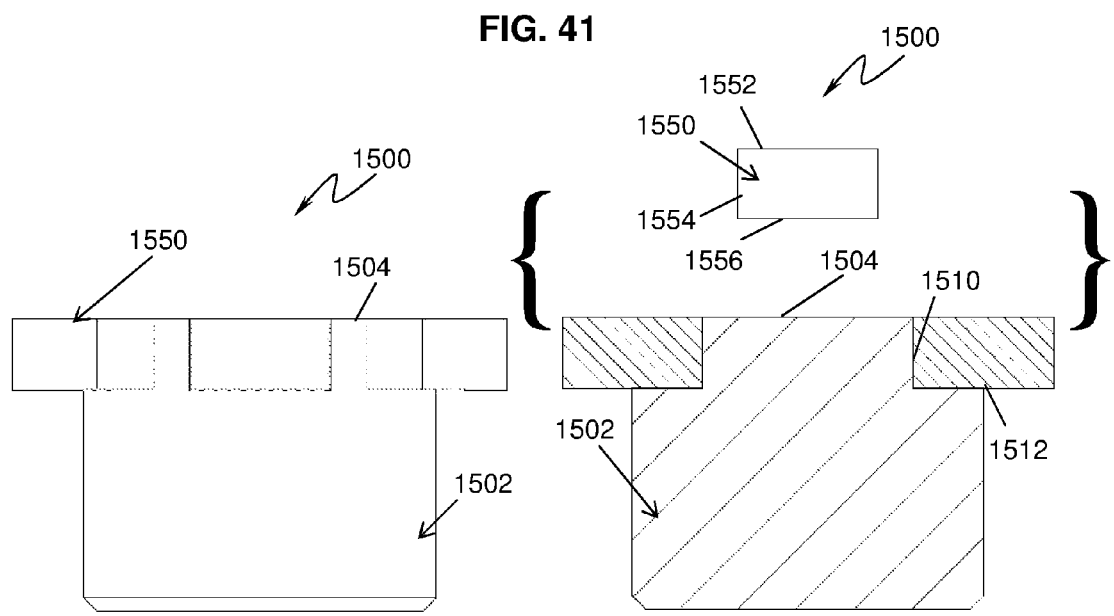
FIG. 42 is a side view of the cutter assembly with at least one island shown in FIG. 41.
FIG. 43 is an exploded, sectional side view of the cutter assembly with at least one island shown in FIG. 41.

For example, turning to FIGS. 41-43, there are four islands 1550 spaced equally apart from each other and equidistant from a center of the surface 1504.

Turning to FIGS. 44-46, the cutter assembly 1600 can have a substrate 1602 with a generally cylindrical shape. The substrate 1602 can have a surface 1604. The surface 1604 can be an end surface. The substrate 1602 can also have a flank surface 1606. The surface 1604 can be substantially perpendicular to the flank surface 1606. The flank surface 1606 can meet the surface 1604 so that a common boundary between the surface 1604 and the flank surface 1606 defines a peripheral edge 1608 of the surface 1604. The surface 1604 can be a substantially planar surface. The flank surface 1606 can provide the substrate 1602 with a generally circular cross-sectional shape. In other embodiments, the substrate 1602 can have a cross-sectional shape that can be triangular, can be similar to a polygon, and/or can have any regular or irregular shape besides circular.

The substrate 1602 can include a pocket 1610 and portion 1614 that can extend the pocket 1610 beyond the flank surface 1606 of the substrate 1602. The portion 1614 can be shaped to receive a portion of the at least one island 1650. As best seen in FIG. 46, the portion 1614 can also be shaped to include a curve between the portion 1614 and the flank surface 1606 of the substrate 1602, and the portion 1614 can further include another curve where the portion 1614 receives the at least one island 1650. The pocket 1610 can have an opening 1612. The opening 1612 can be disposed on the surface 1604, the edge 1608, the flank surface 1606, and the portion 1614 of the substrate 1602. The pocket 1610 can extend from the opening 1612 on the surface 1604, the edge 1608, and the flank surface 1606 to an interior of the substrate 1602. The pocket 1610 can have a shape that can receive at least a portion of the at least one island 1650.

The at least one island 1650 can have a generally cylindrical shape. The at least one island 1650 can have an end surface 1652, a flank surface 1654, and an opposite end surface 1656. The end surface 1652 can be a planar surface that can be substantially perpendicular to the flank surface 1654. The opposite end surface 1656 can also be a planar surface that is substantially perpendicular to the flank surface 1654. The at least one island 1650 can be disposed in the pocket 1610 of the substrate 1602. The at least one island 1650 can be disposed in the pocket 1610 of the substrate 1602 so that the end surface 1652 of the at least one island 1650 is substantially co-planar with surface 1604 of the substrate 1602. The at least one island 1650 can also be disposed in the pocket 1610 of the substrate 1602 so that the flank surface 1654 extends into the interior of the substrate 1602 and protrudes beyond the flank surface 1606 of the substrate 1602. The at least one island 1650 can be further disposed in the pocket 1610 of the substrate 1602 so that the opposite end surface 1656 is at least partially disposed within the interior of the substrate 1602 and partially disposed on the portion 1614. The end surface 1652 can alternatively have a convexity such that the end surface 1652 can protrude from the surface 1604 of the substrate 1602. In a further alternative, the end surface 1652 can have a concavity such that the end surface 1652 can sag from the surface 1604 toward an interior of the substrate 1602. The end surface 1652 can be a cutting surface, or the end surface 1652 and the flank surface 1654 together can form a cutting surface.

In the construction shown in FIGS. 44-46, there are three islands 1650 spaced equally apart from each other and equidistant from a center of the surface 1604. However, in other constructions, there may be more or less than the two islands 1650 shown. Also, the exact position of the islands 1650 with respect to each other or the center of the surface 1604 can be different from that shown in FIGS. 44-46. Also, the exact size of the islands 1650 can be different. The exact number and size of islands 1650 and the exact position for each of the islands 1650 can depend on, for example, the application of the cutter assembly 1600.

Turning to FIGS. 47-49, the cutter assembly 1700 can have a substrate 1702 with a generally cylindrical shape. The substrate 1702 can have two parts 1702a and 1702b. The substrate part 1702a can have a surface 1704a and an opposite surface 1705a that can be opposite to surface 1704a. The surface 1704a can be an end surface, and the surface 1705a can be another end surface. The substrate part 1702a can also have a flank surface 1706a. The surface 1704a, the surface 1705a, or both surfaces 1704a and 1705a can be substantially perpendicular to the flank surface 1706a. The flank surface 1706a can meet the surface 1704a so that a common boundary between the surface 1704a and the flank surface 1706a defines a peripheral edge 1708a of the surface 1704a. The surface 1704a can be a substantially planar surface. The surface 1705a can also be a substantially planar surface. The flank surface 1706a can provide the substrate part 1702a with a generally circular cross-sectional shape. In other embodiments, the substrate part 1702a can have a cross-sectional shape that can be triangular, can be similar to a polygon, and/or can have any regular or irregular shape besides circular.

The substrate part 1702*b* can have a surface 1704*b*. The surface 1704*b* can be an end surface. The surface 1704*b* can be shaped to receive surface 1705*a* of substrate part 1702*a*. The substrate 1702*b* can also have a flank surface 1706*b*. The surface 1704*b* can be substantially perpendicular to the flank surface 1706*b*. The flank surface 1706*b* can meet the surface 1704*b* so that a common boundary between the surface 1704*b* and the flank surface 1706*b* defines a peripheral edge 1708*b* of the surface 1704*b*. The surface 1704*b* can be a substantially planar surface. The flank surface 1706*b* can provide the substrate part 1702*b* with a generally circular cross-sectional shape. In other embodiments, the substrate part 1702*b* can have a cross-sectional shape that can be triangular, can be similar to a polygon, and/or can have any regular or irregular shape besides circular.

The substrate par 1702*a* can include a pocket 1710. The pocket 1710 can have an opening 1712. The opening 1712 can be disposed on the surface 1705*a* of the substrate part 1702*a*. The pocket 1710 can extend from the opening 1712 on the surface 1704 to an interior of the substrate part 1702*a*. The pocket 1710 can have a shape that can receive at least a portion of the at least one island 1750.

The at least one island 1750 can have a generally cylindrical shape. The at least one island 1750 can have an end surface 1752, a flank surface 1754, and an opposite end surface 1756. The end surface 1752 can be a planar surface that can be substantially perpendicular to the flank surface 1754. The opposite end surface 1756 can also be a planar surface that is substantially perpendicular to the flank surface 1754. The at least one island 1750 can be disposed in the pocket 1710 of the substrate part 1702*a*. The at least one island 1750 can be disposed in the pocket 1710 of the substrate part 1702*a* so that the opposite end surface 1756 of the at least one island 1750 is substantially co-planar with surface 1705*a* of the substrate part 1702*a*, the flank surface 1754 extends into the interior of the substrate part 1702*a*, and the end surface 1752 is disposed within the interior of the substrate part 1702*a*. The end surface 1752 can be a cutting surface, or the end surface 1752 and the flank surface 1754 together can form a cutting surface.

In the construction shown in FIGS. 47-49, there are three islands 1750 spaced equally apart from each other and equidistant from a center of the surface 1705*a* and equidistant from the surface 1704*a*. However, in other constructions, there may be more or less than the three islands 1750 shown. Also, the exact position of each of the island 1750 with respect to each other, the center of the surface 1705*a*, or the surface 1704*a* can be different from that shown in FIGS. 47-49. Also, the exact size of the islands 1750 can be different. The exact number and size of islands 1750 and the exact position for each of the islands 1750 can depend on, for example, the application of the cutter assembly 1700.

Turning to FIGS. 50-52, the cutter assembly 1800 can have a substrate 1802 with a generally cylindrical shape. The substrate 1802 can have a surface 1804. The surface 1804 can be an end surface. The substrate 1802 can also have a flank surface 1806. The surface 1804 can be substantially perpendicular to the flank surface 1806. The flank surface 1806 can meet the surface 1804 so that a common boundary between the surface 1804 and the flank surface 1806 defines a peripheral edge 1808 of the surface 1804. The surface 1804 can be a substantially planar surface. The flank surface 1806 can provide the substrate 1802 with a generally circular cross-sectional shape. In other embodiments, the substrate 1802 can have a cross-sectional shape that can be triangular, can be similar to a polygon, and/or can have any regular or irregular shape besides circular.

The substrate 1802 can include a pocket 1810. The pocket 1810 can have an opening 1812. The opening 1812 can be disposed on the surface 1804 of the substrate 1802. The pocket 1810 can extend from the opening 1812 on the surface 1804 to an interior of the substrate 1802. The pocket 1810 can have a shape that can receive at least a portion of the at least one island 1850.

The at least one island 1850 can have a generally cylindrical shape. The at least one island 1850 can have an end surface 1852, a flank surface 1854, and an opposite end surface 1856. The end surface 1852 can be a planar surface that can be substantially perpendicular to the flank surface 1854. The opposite end surface 1856 can also be a planar surface that is substantially perpendicular to the flank surface 1854. The at least one island 1850 can be disposed in the pocket 1810 of the substrate 1802. The at least one island 1850 can be disposed in the pocket 1810 of the substrate 1802 so that the end surface 1852 of the at least one island 1850 is not co-planar with surface 1804 of the substrate 1802 but below the surface 1804 of the substrate. A substrate part 1858 can be disposed in the pocket 1810 on the end surface 1852 of the at least one island 1850. The substrate part 1858 can also extend to the opening 1812 of the pocket 1810 and can be substantially co-planar with the surface 1804 of the substrate 1802. The substrate part 1858 can be made of the same material as the substrate 1802. Alternatively, the substrate part 1858 and the substrate 1802 can be made from different materials. The at least one island 1850 can also be disposed in the pocket 1810 of the substrate 1802 so that the flank surface 1854 extends into the interior of the substrate 1802 and the end surface 1852 is disposed within the interior of the substrate 1802. The end surface 1852 can alternatively have a convexity such that the end surface 1852 can protrude from the surface 1804 of the substrate 1802. In a further alternative, the end surface 1852 can have a concavity such that the end surface 1852 can sag from the surface 1804 toward an interior of the substrate 1802. The end surface 1852 can be a cutting surface, or the end surface 1852 and the flank surface 1854 together can form a cutting surface.

In the construction shown in FIGS. 50-52, there are three islands 1850 spaced equally apart from each other and equidistant from a center of the surface 1804. However, in other constructions, there may be more or less than the three islands 1850 shown. Also, the exact position of each of the island 1850 with respect to each other or the center of the surface 1804 can be different from that shown in FIGS. 50-52. Also, the exact size of the islands 1850 can be different. The exact number and size of islands 1850 and the exact position for each of the islands 1850 can depend on, for example, the application of the cutter assembly 1800. Also in the construction shown in FIGS. 50-52, there are three substrate parts 1858 of the same thickness. However, in other constructions, there may be substrate parts 1858 of different thickness and the exact position of the each of the island 1850 with respect to surface 1804 can be different from that shown in FIGS. 50-52.

Turning to FIGS. 53-55, the cutter assembly 1900 can have a substrate 1902 with a generally cylindrical shape. The substrate 1902 can have a surface 1904. The surface 1904 can be an end surface. The substrate 1902 can also have a flank surface 1906. The surface 1904 can be substantially perpendicular to the flank surface 1906. The flank surface 1906 can meet the surface 1904 so that a common boundary between the surface 1904 and the flank surface 1906 defines a peripheral edge 1908 of the surface 1904. The surface 1904 can be a substantially planar surface. The flank surface 1906 can provide the substrate 1902 with a generally circular cross-sectional shape. In other embodiments, the substrate 1902 can have a cross-sectional shape that can be triangular, can be similar to a polygon, and/or can have any regular or irregular shape besides circular.

The substrate 1902 can include a groove 1914. The groove 1914 may be able to delay contact of the substrate 1902 when the at least one island 1950 is substantially worn. The groove 1914 can disposed on the flank surface 1906. The groove 1914 can penetrate towards an interior of the substrate 1902. The groove 1914 can be shaped like the letter "V", an open polygonal shape, or an open semi-circle as shown in FIGS. 53-55. The groove 1914 can have a length that extends throughout the flank surface 1906 so that the groove 1914 extends entirely around an outer periphery of the substrate 1902. Alternatively, the groove 1914 can extend only through a portion of the flank surface 1906 so that the groove 1914 extends only partially around an outer periphery of the substrate 1902. The groove 1914 can extend substantially straight or meander across the flank surface 1906.

The substrate 1902 can include a pocket 1910. The pocket 1910 can have an opening 1912. The opening 1912 can be disposed on the surface 1904 of the substrate 1902. The pocket 1910 can extend from the opening 1912 on the surface 1904 to an interior of the substrate 1902. The pocket 1910 can have a shape that can receive at least a portion of the at least one island 1950.

The at least one island 1950 can have a generally cylindrical shape. The at least one island 1950 can have an end surface 1952, a flank surface 1954, and an opposite end surface 1956. The end surface 1952 can be a planar surface that can be substantially perpendicular to the flank surface 1954. The opposite end surface 1956 can also be a planar surface that is substantially perpendicular to the flank surface 1954. The at least one island 1950 can be disposed in the pocket 1910 of the substrate 1902. The at least one island 1950 can be disposed in the pocket 1910 of the substrate 1902 so that the end surface 1952 of the at least one island 1950 is substantially co-planar with surface 1904 of the substrate 1902, the flank surface 1954 extends into the interior of the substrate 1902, and the opposite end surface 1956 is disposed within the interior of the substrate 1902. The end surface 1952 can alternatively have a convexity such that the end surface 1952 can protrude from the surface 1904 of the substrate 1902. In a further alternative, the end surface 1952 can have a concavity such that the end surface 1952 can sag from the surface 1904 toward an interior of the substrate 1902. The end surface 1952 can be a cutting surface, or the end surface 1952 and the flank surface 1954 together can form a cutting surface.

In the construction shown in FIGS. 53-55, there are three islands 1950 spaced equally apart from each other and equidistant from a center of the surface 1904. However, in other constructions, there may be more or less than the three islands 1950 shown. Also, the exact position of each of the island 1950 with respect to each other or the center of the surface 1904 can be different from that shown in FIGS. 35-55. Also, the exact size of the islands 1950 can be different. The exact number and size of islands 1950 and the exact position for each of the islands 1950 can depend on, for example, the application of the cutter assembly 1900.

Referring to FIG. 56, a method 2000 of manufacturing the cutter with at least one island is shown. The method 2000 can include providing at least one island, step 2002; treating the at least one island, step 2004; providing a substrate, step 2006; forming a surface circumscribed by a peripheral edge on the substrate, step 2008; forming at least one pocket with an opening on the surface and spaced apart from the peripheral edge such that the at least one pocket extends from the opening towards an interior of the substrate and has a shape that engages with the at least one island, step 2010; disposing the at least one island in the at least one pocket, step 2012; and coupling the at least one island to the at least one pocket, step 2014. Alternatively, in step 2010, the at least one pocket can be formed within the substrate.

The step of providing the at least one island can further comprise forming the at least one island from a polycrystalline diamond made from at least one of a high pressure high temperature process, a chemical vapor deposition process, and a physical vapor deposition process. The step of providing the at least one island can further comprise forming the at least one island from a portion of a polycrystalline diamond.

The method 2000 can further comprise coating the at least one island. The method 2000 can alternatively further comprise encasing the at least one island. The method can further comprise coupling the at least island to the at least one pocket. The at least one island can be coupled to the at least one pocket by press fit, gluing, brazing, bonding, clamping, mechanical interlocking, or welding.

The step of treating the at least one island can further comprise partially leaching the at least one island. Alternatively, the step of treating the at least one island can further comprise substantially fully leaching the at least one island.

The step of disposing the at least one island in the at least one pocket can further comprise disposing the at least one island such that a cutting surface of the at least one island is substantially flush with the surface of the substrate. The step of disposing the at least one island in the at least one pocket can further comprise disposing the at least one island such that a cutting surface of the at least one island protrudes outward from the surface of the substrate. The step of disposing the at least one island in the at least one pocket further comprises disposing the at least one island such that a cutting surface of the at least one island projects towards the interior of the substrate.

The method 2000 can also further comprise providing a cutting surface that has a generally circular shape on the at least one island. Alternatively, the method 2000 can further comprise providing a cutting surface that has a generally ovalular shape on the at least one island. In another alternative, the method 2000 can further comprise providing a cutting surface that has a generally triangular shape. In yet another alternative, the method 2000 can further comprise providing a cutting surface that has a generally polygonal shape.

The method 2000 can further comprise forming at least one other pocket on the surface symmetrically with respect to the at least one pocket; and disposing at least one other island in the at least one other pocket. Alternatively, the method 2000 can further comprise forming at least one other pocket on the surface unsymmetrically with respect to the at least one pocket and disposing at least one other island in the at least one other pocket. In another alternative, the method 2000 can further comprise forming at least one other pocket on the surface spaced apart from the at least one pocket and disposing at least one other island in the at least one other pocket. In yet another alternative, the method 2000 can further comprise forming at least one other pocket on the surface with a second opening conjoined with the opening of the at least one pocket and disposing at least one other island in the at least one other pocket.

The method 2000 can further include forming a planar surface, a concave surface, a dome-shaped surface, a chiseled surface, or a wavy surface with the surface of the substrate and a cutting surface of the at least one island.

The step of providing the substrate can include forming the substrate so as to provide a substrate 102 . . . 1902, as described above and as shown in FIGS. 1-55. Also, the step of providing a substrate can further comprise forming the substrate from carbide, tungsten carbide composite, tungsten carbide composite held up by an eta-phase, polycrystalline cubic boron nitride, polycrystalline diamond, or a combination of two or more of the aforementioned.

The step of providing the at least one pocket can be include forming the at least one pocket so as to provide at least one pocket 110 . . . 1910, as described above and as shown in FIGS. 1-55.

The step of providing the at least one island can be include forming the at least one island so as to provide at least one island 150 . . . 1950, as described above and as shown in FIGS. 1-55. The step of providing the at least one island can further comprise forming the at least one island from polycrystalline diamond, polycrystalline diamond compact, diamond, cubic boron nitride, polycrystalline cubic boron nitride, diamond-silicon carbide composite material, polycrystalline diamond composite, chemical vapor deposition diamond, or a combination of two or more of the aforementioned.

Figure 57:
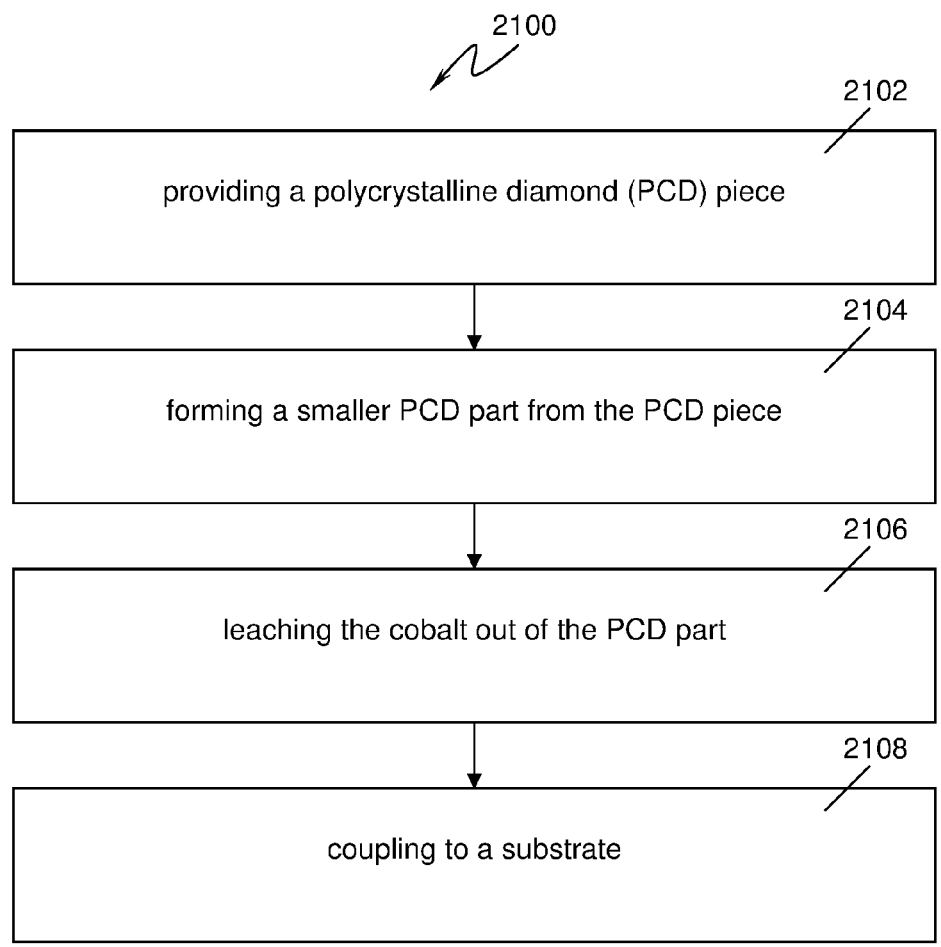
FIG. 57 is a flowchart of a method of manufacturing a cutter with at least one island in accordance with an alternate construction.

Referring to FIG. 57, a method 2100 of manufacturing the cutter with at least one island is shown. The method 2000 of manufacturing can include providing a PCD piece from a high pressure, high temperature (HPHT) process, step 2102. Alternatively, the PCD can be provided from a chemical vapor deposition (CVD), a physical vapor deposition (PVD), or some other suitable process. The method can also include forming a smaller PCD part from the PCD piece, step 2104. The method can further include fully or partially leaching the cobalt out of the PCD part, step 2106. The PCD part can then be coated with, for example, a tungsten coating, or the PCD part can be press fitted into a casing, such as a metal casing. The PCD part with or without a coating or a casing can then be coupled to the substrate, step 2108. The coupling can be by, for example, gluing, brazing, bonding, welding, clamping, mechanical locking, or any other suitable coupling.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The use of any and all examples, or exemplary language (e.g., "such as") provided herein, is intended merely to better illuminate the invention and does not pose a limitation on the scope of the invention unless otherwise claimed. No item or component is essential to the practice of the invention unless the element is specifically described as "essential" or "critical". The words "mechanism" and "element" are used broadly and are not limited to mechanical or physical embodiments, but may include software routines in conjunction with processors, etc. It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Numerous modifications and adaptations will be readily apparent to those of ordinary skill in this art without departing from the spirit and scope of the present invention as defined by the following claims. Therefore, the scope of the invention is defined not by the detailed description of the invention but by the following claims, and all differences within the scope will be construed as being included in the invention.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A cutter assembly, comprising:
a substrate comprising at least one pocket extending from an end surface; and
at least one island disposed in the at least one pocket,
wherein the at least one island comprises a thermally stable material that is selected from the group consisting of diamond-silicon carbide composite, a polycrystalline diamond, polycrystalline diamond compact, diamond, cubic boron nitride, polycrystalline cubic boron nitride, polycrystalline diamond composite, chemical vapor deposition diamond, and a combination of two or more of the aforementioned,
wherein the at least one island is directly coupled to the at least one pocket such that an end surface of the at least one island is substantially co-planar with the end surface of the substrate,
wherein the substrate and the at least one pocket are formed before disposing the at least one island in the at least one pocket,
wherein the at least one pocket is completely circumscribed by the substrate, and
wherein, in the finished cutter assembly, the at least one island is directly coupled to the at least one pocket without compaction securement.

2. A cutter assembly according to claim 1, wherein the substrate is made from carbide, tungsten carbide composite, tungsten carbide composite held up by an eta-phase, polycrystalline cubic boron nitride, polycrystalline diamond, or a combination of two or more of the aforementioned.

3. A cutter assembly according to claim 1, wherein the at least one island is made from a partially leached material.

4. A cutter assembly according to claim 1, wherein the at least one island is made from a substantially fully leached material.

5. A cutter assembly according to claim 1, wherein the thermally stable material is selected from the group consisting of diamond-silicon carbide composite and a polycrystalline diamond.

6. A cutter assembly according to claim 1, wherein the at least one island is directly coupled to the at least one pocket by press fit, gluing, brazing, bonding, clamping, mechanical interlocking, or welding.

* * * * *